United States Patent
Toukura

(10) Patent No.: US 7,300,717 B2
(45) Date of Patent: Nov. 27, 2007

(54) CONTROL DEVICE FOR FUEL CELL SYSTEM AND RELATED METHOD

(75) Inventor: Nobusuke Toukura, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 477 days.

(21) Appl. No.: 10/496,458

(22) PCT Filed: Jun. 18, 2003

(86) PCT No.: PCT/JP03/07712

§ 371 (c)(1),
(2), (4) Date: May 24, 2004

(87) PCT Pub. No.: WO2004/006372

PCT Pub. Date: Jan. 15, 2004

(65) Prior Publication Data

US 2005/0003250 A1    Jan. 6, 2005

(30) Foreign Application Priority Data

Jul. 5, 2002    (JP) .............................. 2002-197573

(51) Int. Cl.
*H01M 8/04*    (2006.01)
(52) U.S. Cl. .............................. 429/24; 429/13; 429/22
(58) Field of Classification Search ..................... None
See application file for complete search history.

(56) References Cited

U.S. PATENT DOCUMENTS 6,406,805 B1    6/2002    James et al.

| | | | |
|---|---|---|---|
| 2001/0014415 A1 | 8/2001 | Iio et al. | |
| 2001/0016276 A1* | 8/2001 | Yamanashi | 429/22 |
| 2001/0049040 A1* | 12/2001 | Grune et al. | 429/26 |
| 2003/0022041 A1 | 1/2003 | Barton et al. | |

FOREIGN PATENT DOCUMENTS

| JP | 2000-040519 A | 2/2000 |
|---|---|---|
| JP | 2001-307757 A | 11/2001 |
| JP | 2002-110211 A | 4/2002 |

* cited by examiner

*Primary Examiner*—Jonathan Crepeau
*Assistant Examiner*—Tony Chuo
(74) *Attorney, Agent, or Firm*—Foley & Lardner LLP

(57) ABSTRACT

A control device for a fuel cell system (2) having a fuel cell stack (11) with an oxidizing electrode (11*b*) supplied with oxidizing gas and a fuel electrode (11*a*) supplied with fuel gas to generate an electric power is disclosed having an estimating section (13) estimating occurrence of a water-clogging phenomenon wherein condensed water stays in a fuel gas flow passage (HL, HL') through which fuel gas is supplied to the fuel electrode of the fuel cell stack, and a control section (14) controlling a fuel gas exhaust valve (15), which is disposed downstream of the fuel cell stack to allow the fuel gas to be exhausted from the fuel cell stack, to be brought into an opened condition when the estimating section estimates the occurrence of the water-clogging phenomenon.

14 Claims, 15 Drawing Sheets

CONTROL DEVICE FOR FUEL CELL SYSTEM AND RELATED METHOD

TECHNICAL FIELD

The present invention relates to a control device for a fuel cell system and a related method and, more particularly, to a control device for a fuel cell system and its related method, wherein electric power generated by a fuel cell stack installed in a vehicle is supplied to a motor to generate drive power, for removing water stayed in the fuel cell stack.

BACKGROUND ART

With fuel cell systems, in order for a fuel cell stack to initiate electric power generating reaction, a probability arises in which, due to water being required as medium for causing ion transfer through an ion-exchange film, fuel gas and oxidizing gas are supplied under a moistened condition.

With such a fuel cell system, ideally, it is desired for fuel gas and oxidizing gas to prevail under moisture of 100% with no occurrence of excessive water. However, in an actual practice, owing to an excessive amount of moistening water or resulting water accompanied by electric power generating operation of the fuel cell stack, it is highly probable for moisture to excessively prevail in a gas flow passage inside the fuel cell stack. As the amount of moisture occurring in the gas flow passage increases, a difficulty is encountered for gas to permeate through the ion-exchange film, causing a decrease in a cell voltage with deterioration being caused in an electric power generating efficiency of the fuel cell stack.

Japanese Patent Application Laid-Open Publication No. 2001-307757 discloses a structure wherein, when a minimal cell voltage is excessively lowered with respect to an average unit cell power output amount of a fuel cell stack, the discrimination is made that an excessively increased amount of moisture prevails in a gas flow passage of the fuel cell stack, thereby executing purging of fuel gas through the use of a purge valve connected in communication with the fuel cell stack.

Further, with the fuel cell system, although the fuel cell stack generates the electric power output accompanied by generation of heat, since an operating temperature for enabling a solid polymer film to efficiently generate electric power should prevail in a limited range, the fuel cell stack should be kept within a given temperature range by permitting coolant to flow through the fuel cell stack. Here, when considering the occurrence of the greatest increase in the gas temperature within the fuel cell stack, in order to lower the gas temperature, a coolant flow passage is required to be located in an area possibly closest to the gas flow passage to allow coolant to flow near the gas stream. To this end, a structure may be provided that allows fuel gas and coolant to flow in adjacent flow paths separated from one another via a porous film.

Furthermore, with the fuel cell system, in a case where the fuel cell stack is installed on an automobile, there are many probabilities in that coolant is cooled with a wind stream passing through a radiator located in front of the vehicle and supplied to the fuel cell stack.

DISCLOSURE OF INVENTION

Further, upon studies conducted by the present inventor, with the fuel cell system, although the fuel cell stack generates the electric power output accompanied by genera-tion of heat, since an operating temperature for enabling a solid polymer film to efficiently generate electric power should prevail in a limited range, the fuel cell stack should be kept within a given temperature range by permitting coolant to flow through the fuel cell stack. Here, when considering the occurrence of the greatest increase in the gas temperature within the fuel cell stack, in order to lower the gas temperature, a coolant flow passage is required to be located in an area possibly closest to the gas flow passage to allow coolant to flow near the gas stream. To this end, a structure may be provided that allows fuel gas and coolant to flow in adjacent the flow paths separated from one another via a porous film.

Furthermore, with the fuel cell system, in a case where the fuel cell stack is installed on an automobile, there are many probabilities in that coolant is cooled with a wind stream passing through a radiator located in front of the vehicle and supplied to the fuel cell stack.

However, upon studies conducted by the present inventor, as the fuel cell powered vehicle continuously travels on a high-way road, because of continuing increased amount of electric power output generated by the fuel cell stack, it is probable for the coolant temperature to build up at a high temperature. If the vehicle shifts from a traveling condition, in which the coolant temperature remains at a high level, to a cruising traveling condition, it is conceivable that the fuel cell stack decreases the amount of electric power output, accompanied by reduction in the heat value and the coolant temperature rapidly drops. Especially, in a case where the vehicle speed is high, since the wind stream passing through the radiator increases, it is highly probable for the coolant temperature to rapidly drop.

Under such circumstances, it is conceived that rapid temperature drop occurs in gas flowing through the gas flow passage inside the fuel cell stack to cause steam in the gas stream delivered to the fuel cell stack to be condensed in a large amount to form liquid water which in turn flows into the fuel cell stack. In such case, it is conceived that the existence of liquid water entering the gas flow passage blocks gas to permeate through the ion-exchange film to cause rapid deterioration in the electric power generating efficiency, and a probability occurs in which even if the purging of fuel gas takes place, it is hard to restore the electric power generation efficiency of the fuel cell stack.

The present invention has been made based on the studies stated above and has an object to provide a control device for a fuel cell system and its related method, wherein, even when a temperature of gas to be supplied to a fuel cell stack rapidly drops, it is possible to prevent an electric power generating efficiency from being deteriorated.

To achieve the above object, in one aspect of the present invention, there is provided a control device for a fuel cell system having a fuel cell stack with an oxidizing electrode supplied with oxidizing gas and a fuel electrode supplied with fuel gas to generate an electric power, the control device comprising: an estimating section estimating occurrence of a water-clogging phenomenon wherein condensed water stays in a fuel gas flow passage through which fuel gas is supplied to a fuel electrode of a fuel cell stack; and a control section controlling a fuel gas exhaust valve, which is disposed downstream of the fuel cell stack to allow the fuel gas to be exhausted from the fuel cell stack, to be brought into an open condition in a case that the estimating section estimates the occurrence of the water-clogging phenomenon.

Stated another way, in another aspect of the present invention, there is provided a control device for a fuel cell system having a fuel cell stack with an oxidizing electrode supplied with oxidizing gas and a fuel electrode supplied with fuel gas to generate an electric power, the control device comprising: estimating means for estimating occurrence of a water-clogging phenomenon wherein condensed water stays in a fuel gas flow passage through which fuel gas is supplied to a fuel electrode of a fuel cell stack; and control means for controlling a fuel gas exhaust valve, which is disposed downstream of the fuel cell stack to allow the fuel gas to be exhausted from the fuel cell stack, to be brought into an open condition in a case that the estimating means estimates the occurrence of the water-clogging phenomenon.

In the meantime, in another aspect of the present invention, there is provided a control method for a fuel cell system having a fuel cell stack with an oxidizing electrode supplied with oxidizing gas and a fuel electrode supplied with fuel gas to generate an electric power, the control method comprising: estimating occurrence of a water-clogging phenomenon wherein condensed water stays in a fuel gas flow passage through which fuel gas is supplied to a fuel electrode of a fuel cell stack; and controlling a fuel gas exhaust valve, which is disposed downstream of the fuel cell stack to allow the fuel gas to be exhausted from the fuel cell stack, to be brought into an open condition in a case that the occurrence of the water-clogging phenomenon is estimated.

BEST MODE FOR CARRYING OUT THE INVENTION

Hereinafter, a control device of a fuel cell system and its related method of each embodiment according to the present invention are described in detail with suitable reference to the accompanying drawings.

First Embodiment

A control device for a fuel cell system and its related method of a first embodiment according to the present invention are described in detail with reference to FIGS. 1 to 5E.

First, a structure of a fuel cell powered vehicle having the fuel cell system of the presently filed embodiment is described with reference to FIGS. 1 and 2.

Structure of Fuel Cell Powered Vehicle

Figure 1:
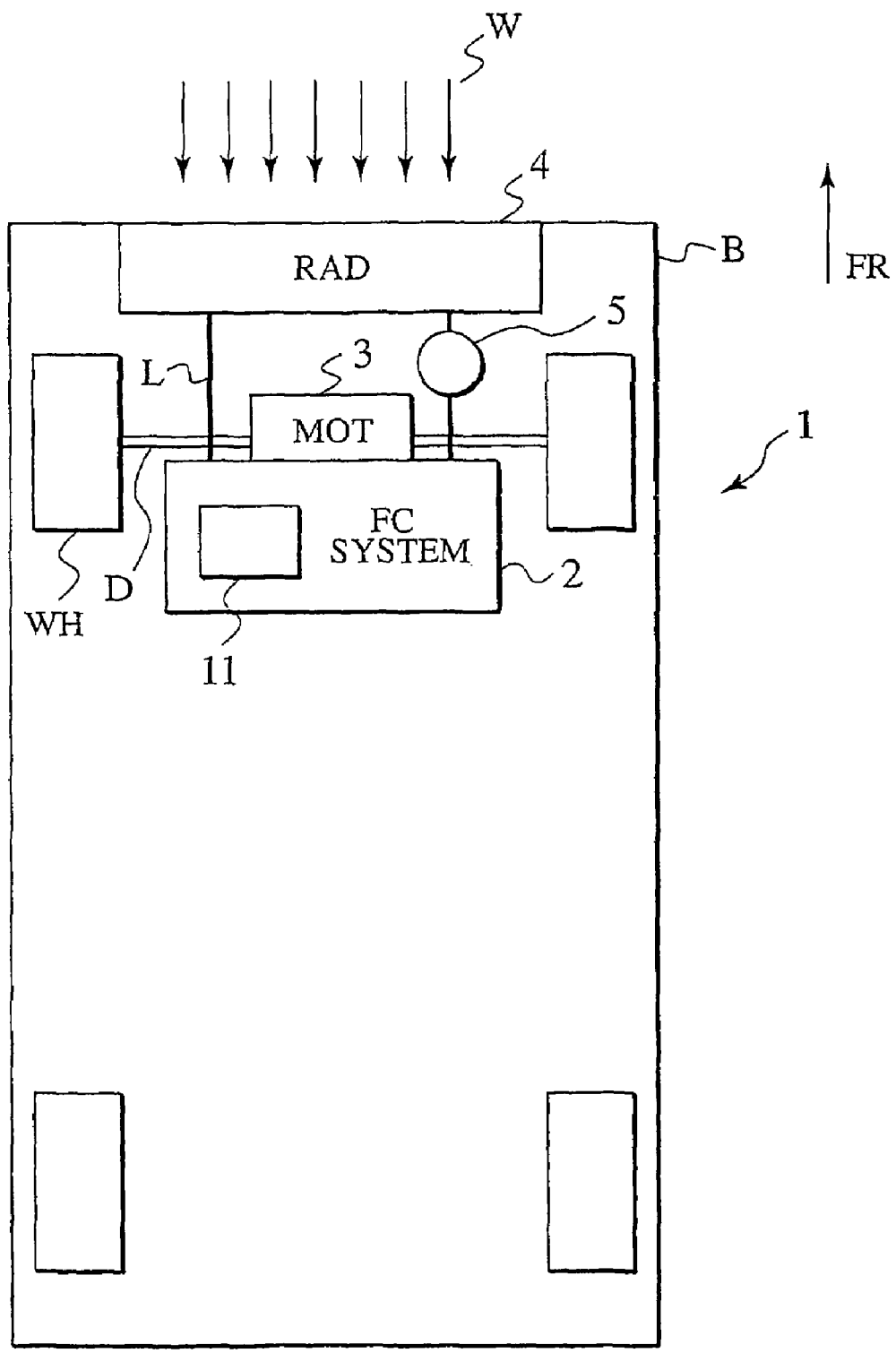
FIG. 1 is a block diagram illustrating a structure of a fuel cell powered vehicle having a fuel cell system of a first embodiment according to the present invention.

FIG. 1 is a block diagram illustrating a structure of a fuel cell powered vehicle having a fuel cell system according to the presently filed embodiment.

As shown in FIG. 1, the fuel cell system 2 of the presently filed embodiment is shown as installed on a fuel cell powered vehicle 1.

The fuel cell powered vehicle 1 uses an electric power supply that utilizes an electric power output generated by the fuel cell system 2 and has an electric motor 3 adapted to be supplied with the electric power output generated by the fuel cell system 2, with drive power of the electric motor 3 being transmitted through a drive power line D to wheels WH to travel. During traveling, the fuel cell powered vehicle 1 draws a traveling wind stream W from a vehicle front FR into a radiator 4 located in a front of a vehicle body B to cool coolant that circulates between a fuel cell stack 11, inside the fuel cell system 2, and the radiator 4. During an electric power generating operation of the fuel cell system 2, the fuel cell powered vehicle 1 drives a pump 5 which in turn allows the coolant, cooled by the radiator 4, to be circulated through a delivery pipe L.

Figure 2:
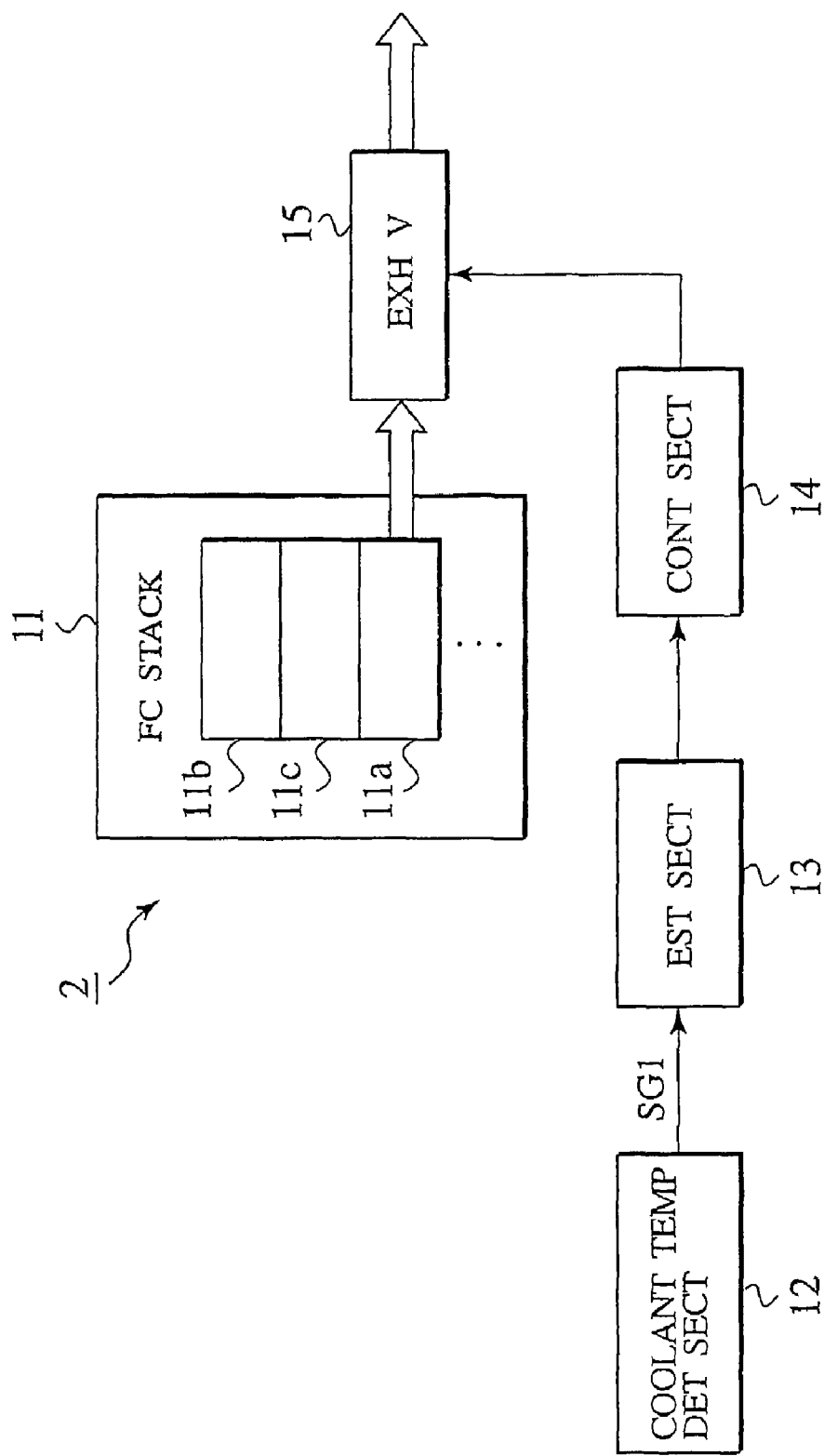
FIG. 2 is a block diagram for illustrating a functional structure of the fuel cell system of the present embodiment.

FIG. 2 is a block diagram for illustrating a functional structure of the fuel cell system of the presently filed embodiment.

As shown in FIG. 2, the fuel cell system 2 of the fuel cell powered vehicle 1 includes a fuel cell stack 11, which is constructed of a plurality of stacks each of which includes a fuel electrode 11a and an oxidizing electrode 11b between which an electrolyte 11c composed of a polymer film is sandwiched, wherein fuel gas is supplied to the fuel electrode 11a and oxidizing gas is supplied to the oxidizing electrode 11b for thereby generating an electric power output. In the presently filed embodiment, typically, hydrogen gas is supplied to the fuel cell stack 11 as fuel gas while air is supplied thereto as oxidizing gas.

During traveling of the fuel cell powered vehicle 1, with the fuel cell system 2, the fuel electrode 11a and the oxidizing electrode 11b of the fuel cell stack 11 are supplied with the hydrogen and the air, respectively. When this takes place, the fuel cell system 2 allows a coolant temperature detecting section 12 to detect the temperature of the coolant circulating between the radiator 4 and the fuel cell stack 11, and a coolant-clogging estimating section 13 estimates a probability of an occurrence of a coolant-clogging phenomenon in the fuel cell stack 11 based on resulting coolant temperature. If the coolant-clogging estimating section 13 estimates the occurrence of the coolant-clogging phenomenon, a fuel gas exhaust control section 14 operates to render a fuel gas exhaust valve 15 to be brought into an open condition so as to allow condensed water to be exhausted to the outside from a fuel gas flow passage inside the fuel cell stack 11.

Next, a concrete structure of the fuel cell system 2 of the presently filed embodiment is described with reference to FIG. 3. Also, while the presently filed embodiment is herein described in connection with an example in which the hydrogen is directly reserved as fuel gas, it is of course not objectionable to employ an alternative system wherein hydrogen is obtained by reforming fuel.

Concrete Structure of Fuel Cell System

Figure 3:
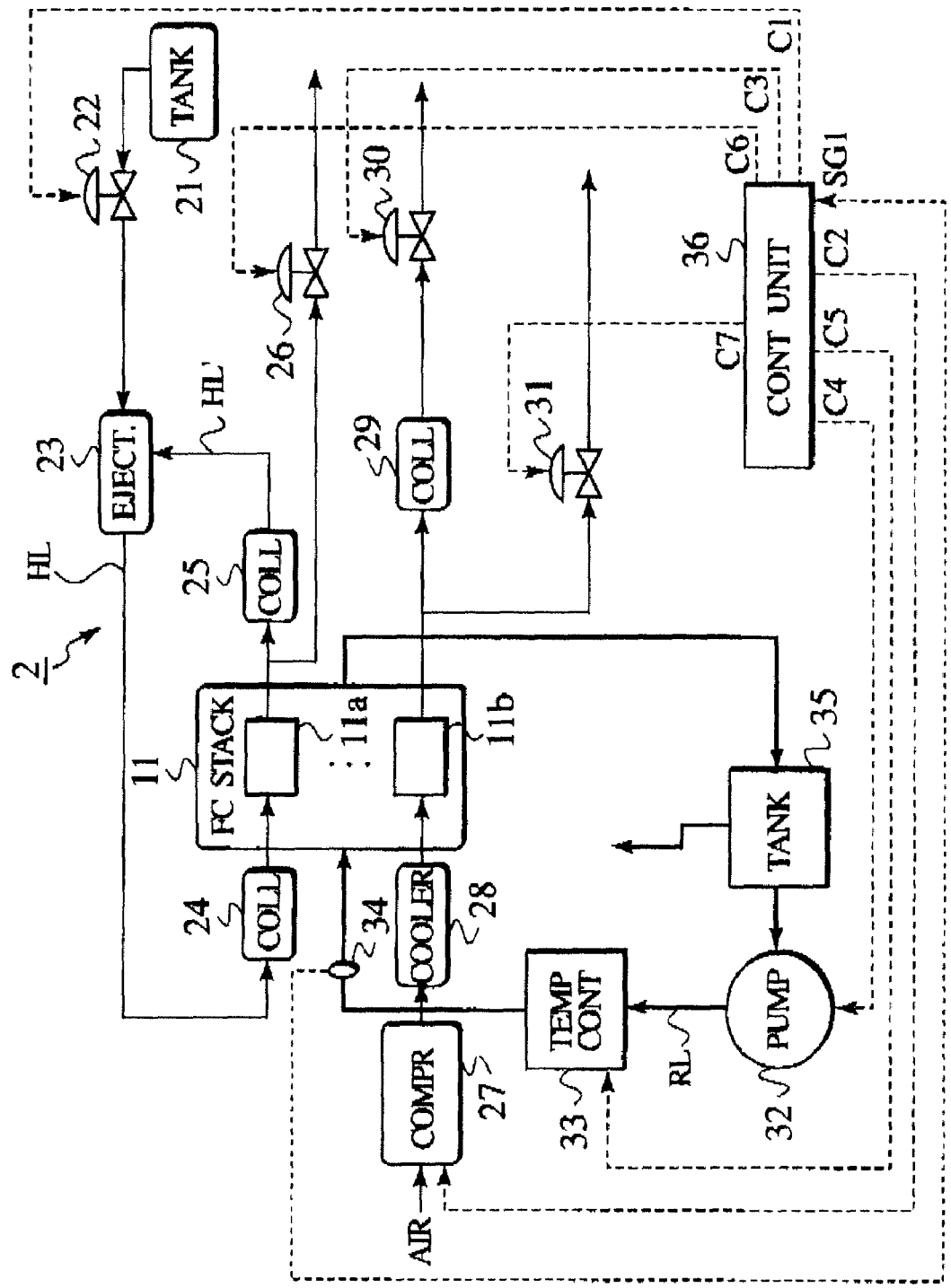
FIG. 3 is a block diagram illustrating a concrete structure of the fuel cell system of the present embodiment.

FIG. 3 is a block diagram illustrating a concrete structure of the fuel cell system of the presently filed embodiment.

In FIG. 3, the fuel cell system 2 allows the hydrogen gas to be supplied to the fuel electrode 11a of the fuel cell stack 11, which is constructed of the plurality of stacks each of which includes the fuel electrode 11a and the oxidizing electrode 11b between which the electrolyte 11c (see FIG. 2) composed of a polymer film is sandwiched, while permitting the hydrogen gas to be supplied to the fuel electrode 11a and the air to be supplied to the oxidizing electrode 11b, causing the fuel cell stack 11 to generate the electric power output. The fuel cell stack 11 is internally provided with a hydrogen gas flow passage, an air flow passage and a coolant flow passage, either of which is herein not shown.

The hydrogen gas is compressed and stored in a hydrogen storage tank 21 under a high pressure.

During electric power generating operation of the fuel cell stack 11, the hydrogen gas stored in the hydrogen storage tank 21 is suitably adjusted and reduced in gas pressure by a hydrogen pressure regulating valve 22 and, thereafter, supplied to a hydrogen gas conduit HL in communication with the fuel cell stack 11. Also, while the presently filed embodiment has been shown in conjunction with a structure where the hydrogen storage tank 21 and the hydrogen pressure regulating valve 22 are in direct communication with the fuel cell stack 11, it may of course be altered such that a separate valve for further reduction in gas pressure is located in a midcourse leading to the fuel cell stack 11.

Here, during transfer of the hydrogen gas toward the fuel cell stack 11, the hydrogen gas is supplied to an ejector circulation unit 23 located in the circulation pipe line HL. The ejector circulation unit 23 serves to mix the hydrogen gas, which is delivered from the hydrogen gas storage tank 21, and the hydrogen gas, which is exhausted from the fuel cell stack 11 without being consumed, and supply resulting mixed gas to the fuel cell stack 11.

Subsequently, the hydrogen gas, which is fed from the ejector circulation unit 23 to the fuel cell stack 11, flows through a water collection unit 24 by which moisture contained in the hydrogen gas is recovered. Here, although there are many probabilities where steam contained in the hydrogen gas is condensed by radiation heat cooling of the pipe line HL extending between the ejector circulation unit 23 and the fuel cell stack 11 into the moisture, the hydrogen gas and the moisture in the hydrogen gas are completely separated by the water collection unit 24 disposed in front of an inlet of the fuel cell stack 11 to remove the moisture from the hydrogen gas, which in turn is supplied to the fuel cell stack 11.

Then, with the fuel cell stack 11, the fuel electrode 11a consumes the hydrogen gas supplied with no moisture content, and residual hydrogen gas, which is not consumed, is delivered to the ejector circulation unit 23.

Here, disposed in a circulation pipe line HL' between a hydrogen exhaust side of the fuel cell stack 11 and the ejector circulation unit 23 is a condensed water collection unit 25 by which condensed water is collected from the hydrogen gas.

Further, disposed at the hydrogen exhaust side of the fuel cell stack 11 is a hydrogen gas exhaust valve 26 that is comprised of an opening and closing valve. The hydrogen gas exhaust valve 26 is brought into an open condition in a situation where, due to rapid drop in the electric power output demanded to the fuel cell stack 11 or when operation of the fuel cell stack 11 is interrupted, a difficulty is encountered in consuming the hydrogen gas prevailing in the circulation pipe lines HL, HL'. As a result, the hydrogen gas exhaust valve 26 discharges the hydrogen gas, which prevails in the circulation pipe lines HL, HL' and can not be consumed, to the outside. Additionally, although it is preferable for the hydrogen gas exhaust valve 26 to be preferably comprised of an opening and closing valve with a view to achieving a simplicity of control, it may of course be possible to use a flow rate and pressure regulating valve of which opening is controllable. Also, this hydrogen gas exhaust valve 26 corresponds to the fuel gas exhaust valve 15 in FIG. 2.

In the meantime, during electric power generating operation of the fuel cell stack 11, the fuel cell system 2 draws atmospheric air by means of an air compressor 27 to be delivered to the fuel cell stack 11.

Here, the air compressed by the air compressor 27 is raised at a high temperature and, in order to allow the fuel cell stack 11 to efficiently react, the air is cooled by an air cooler 28 disposed at an air inlet of the fuel cell stack 11.

In addition, although residual air gas, resulting from the air whose oxygen is consumed by the oxidizing electrode 11b of the fuel cell stack 11, contains the moisture resulting from reaction taking place inside the fuel cell stack 11 and condensed therein, resulting moisture is collected by a water collection unit 29 and, thereafter, resulting air gas is expelled to the atmosphere through an air pressure regulating valve 30 that is disposed at an air exhaust side of the fuel cell stack 11. Here, the air pressure is controlled by adjusting the opening degree of the air pressure regulating valve 30. Also, disposed at the air exhaust side of the fuel cell stack 11 is an air purge valve 31. The air purge valve 31 is arranged to remain in an open state during removal of condensed water from the oxidizing electrode 11b.

Further, the coolant for cooling the fuel cell stack 11 and adjusting temperature thereof may include ethylene glycol with an increased boiling temperature. This coolant is fed to a circulation line RL by a pump 32 and is fed to the fuel cell stack 11 through a temperature controller 33 that operates in cooperation with the radiator and a fan to maintain the temperature at an approximately fixed level.

Then, the coolant achieves heat-exchange in the fuel cell stack 11 to cool the fuel cell stack 11 for adjusting the temperature thereof. When this takes place, operation of the temperature controller 33 is controlled in response to the coolant temperature detected by the coolant temperature sensor 34 disposed at the coolant inlet side of the fuel cell stack 11. Also, it is to be noted that the pump 32 corresponds to the pump 5 shown in FIG. 1 and the coolant temperature sensor 34 corresponds to the coolant temperature detecting unit 12 shown in FIG. 2, and the temperature controller 33 includes the radiator 4 shown in FIG. 1.

Here, the coolant pressure is regulated to be maintained at the substantially same level with respect to the hydrogen gas pressure and the air pressure substantially made equal to one another and respectively varying depending on an output voltage of the fuel cell stack 11, while controlling the discharge flow rate of the pump 32.

Here, the hydrogen gas pressure and the air pressure are regulated to prevail at substantially equal levels, respectively, in the fuel cell stack 11 wherein controlling the discharge flow rate of the pump 32 causes the coolant pressure to vary depending on an output voltage of the fuel cell stack 11.

Also, while the presently filed embodiment has been described with reference to the structure wherein the coolant pressure is controlled at the same time that the discharge flow rate of the pump 32 is controlled, it may be altered such that an orifice valve is disposed in the coolant flow passage for thereby controlling the coolant pressure in a more finely fashion.

Subsequently, the coolant, which is heated up during electric power generating operation of the fuel cell stack 11, is returned to a reservoir tank 35 prior to being returned to the pump 32. This results in a function to absorb rapid pressure variation such as water hammer phenomenon or to play a role as an accumulator for the flow rate of the pump 32.

During electric power generating operation of the fuel cell stack 11, such a fuel cell control system 2 is operative to cause a control unit 36 to output a control signal C1 for adjusting the opening degree of the hydrogen pressure regulating valve 22, a control signal C2 for adjusting the amount of displacement of the compressor 27, a control signal C3 for adjusting the opening degree of the air pressure regulating valve 30, a control signal C4 for adjusting the amount of displacement of the pump 32, and a control signal C5 for adjusting the amount of displacement of the temperature controller 33.

Further, the control unit 36 reads in the sensor signal SG1 delivered from the coolant temperature sensor 34 and estimates the occurrence of the water-clogging phenomenon of the fuel cell stack 11 to output a control signal C6 to the hydrogen gas exhaust valve 26 to execute fuel gas exhaust valve control operation for controllably opening and closing the hydrogen gas exhaust valve 26. Also, it is to be noted that the control unit 36 includes the water-clogging estimating section 13 and the fuel gas exhaust control section 14, shown in FIG. 2, which form a functional block of the control unit 36.

Further, during an air purge mode of the fuel cell stack 11, the control unit 36 is operative to output the control signal C7 to the air purge valve 31 for opening the air purge valve 31.

Next, fuel gas exhaust valve controlling operation of the fuel cell system 2 of the presently filed embodiment is described with reference to FIGS. 4 and 5.

Fuel Gas Exhaust Valve Control Operation

Figure 4:
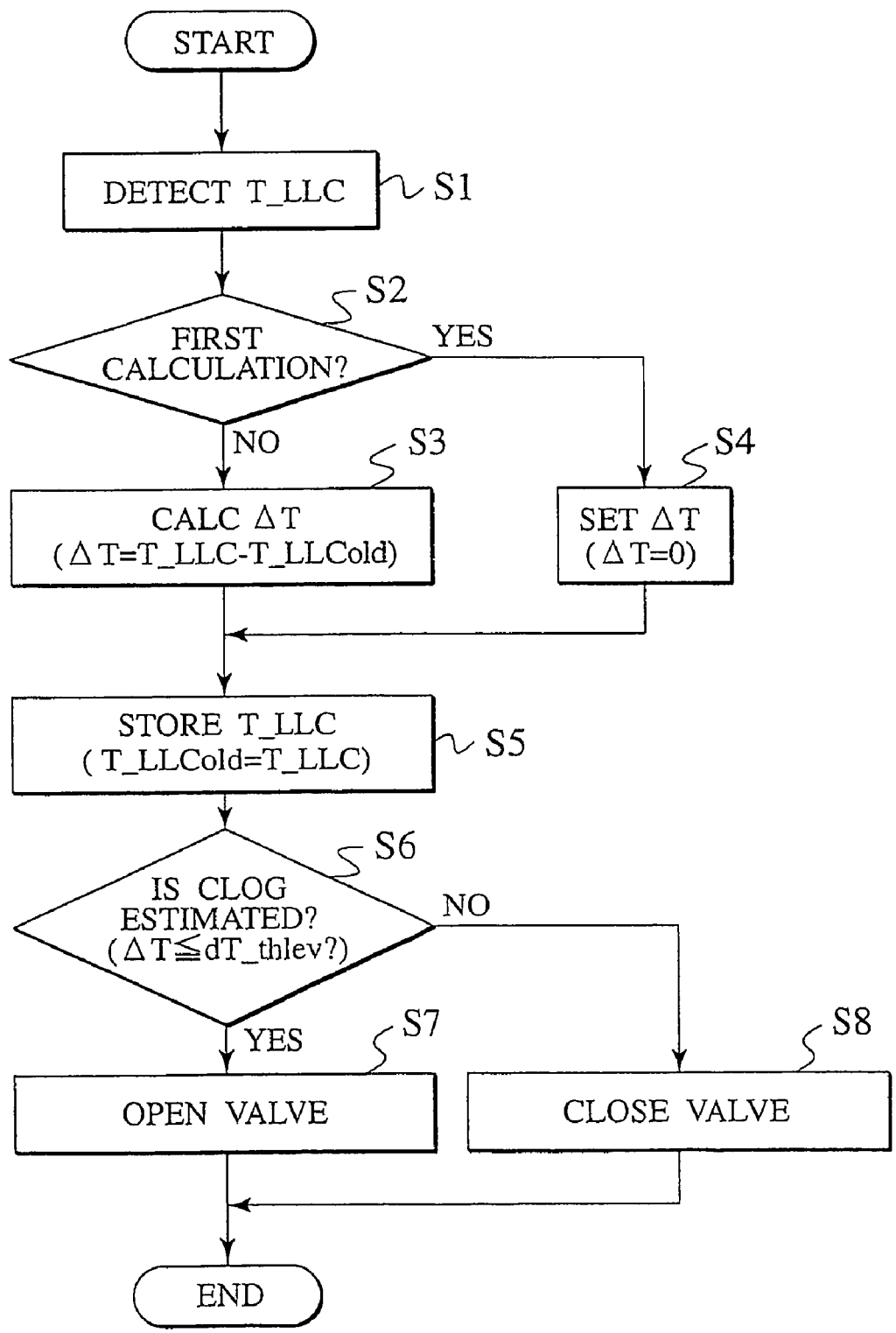
FIG. 4 is a flowchart illustrating an operational sequence of fuel gas exhaust valve control operation to be performed by the fuel cell system of the present embodiment.
Figure 5:
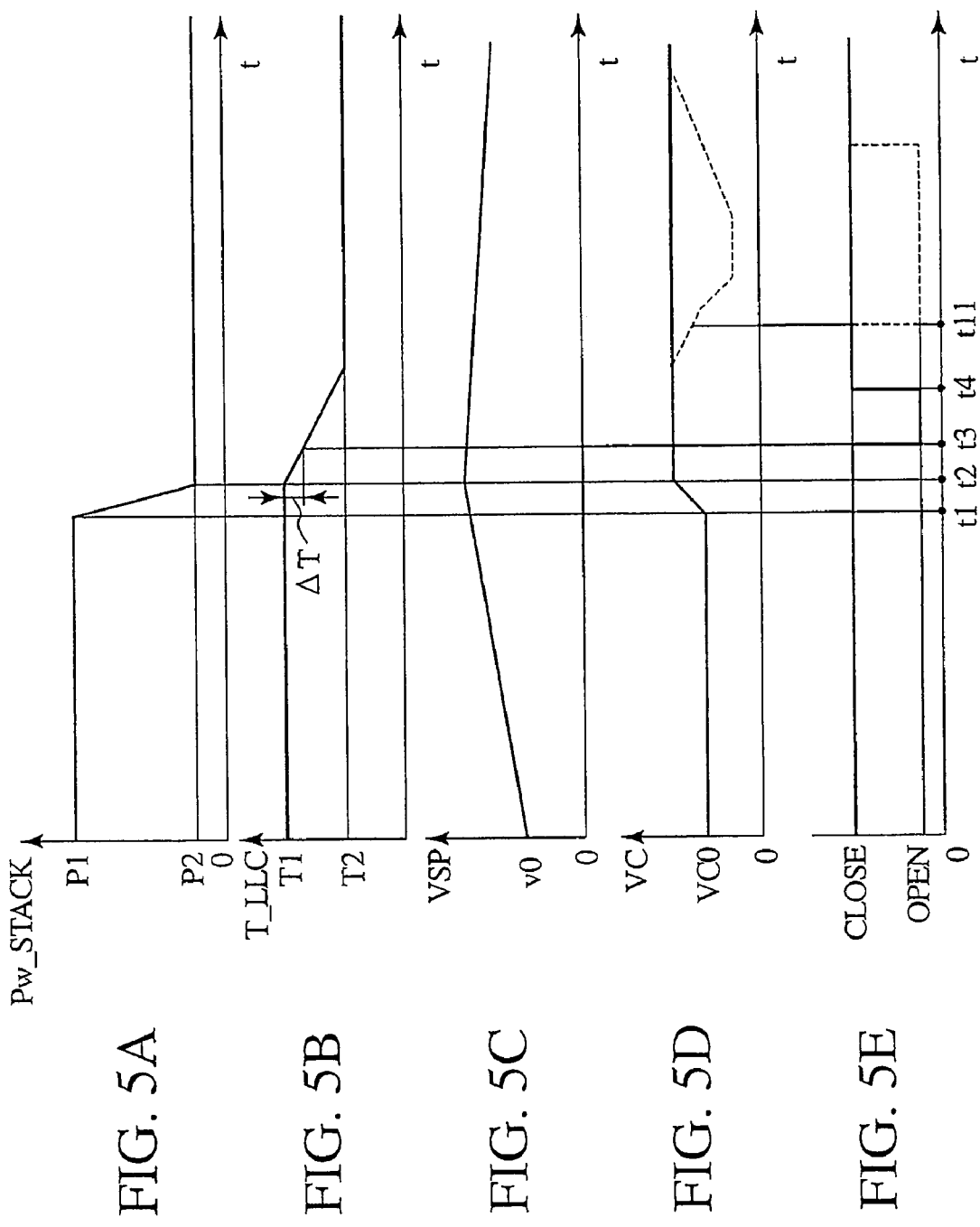
FIG. 5A is a timing chart related to an electric power output of a fuel cell stack for illustrating fuel gas exhaust valve control operation of the fuel cell system, with the abscissa representing time t while the ordinate represents the electric power output Pw_STACK of the fuel cell stack in the present embodiment.
FIG. 5B is a timing chart related to a coolant temperature, with the abscissa representing time t while the ordinate represents the coolant temperature T_LLC of the fuel cell stack in the present embodiment.
FIG. 5C is a timing chart related to a vehicle speed, with the abscissa representing time t while the ordinate represents the vehicle speed VSP in the present embodiment.
FIG. 5D is a timing chart related to a minimal cell voltage, with the abscissa representing time t while the ordinate represents the minimal cell voltage VC in the present embodiment.
FIG. 5E is a timing chart related to an operation of a fuel gas exhaust valve, with the abscissa representing time t while the ordinate represents an opened and closed condition of the fuel gas exhaust valve of the fuel cell system of the present embodiment.

FIG. 4 is a flowchart illustrating an operational sequence of fuel gas exhaust valve control operation to be executed by the fuel cell system according to the present invention. Also, fuel gas exhaust valve control operation of the fuel cell system 2 is executed for a given time interval, i.e., an equal time interval (such as each 10 msec) using a timer (not shown) internally provided in the control unit 36.

In FIG. 4, first, the control unit 36 reads in the sensor signal SG1 delivered from the coolant temperature sensor 34 (the coolant temperature detecting section 12) in step S1 and detects the coolant temperature T_LLC whereupon operation is routed to step S2.

In consecutive step S2, the discrimination is made to see whether current fuel gas exhaust valve control operation corresponds to the first calculation after the fuel cell system 2 is started up, whereupon, when discriminated that no such a first calculation is involved, the flow is routed to step S3, whereas when discriminated that the first calculation is involved, the flow proceeds to step S4. Here, the control unit 36 is arranged such that, immediately after starting up the fuel cell system 2, the calculating operation discriminating flag is initialized to "0 (zero)" and, after the fuel cell system 2 has been started up, the calculating operation discriminating flag is set equal to 1" such that referring to the flag enables the discrimination in step S2.

In succeeding step S3, calculation is implemented to see a differential component between the coolant temperature T_LLC, currently detected in step S1, and the coolant temperature T_LLCold, detected in preceding operation for obtaining a coolant temperature drop value $\Delta T$ (i.e. $\Delta T = T\_LLC - T\_LLCold$) whereupon the flow proceeds to step S5. Here, in case of current coolant temperature T_LLC being decreased to a lower value than the preceding coolant temperature T_LLCold, the coolant temperature drop value ΔT falls in a negative value.

In the meantime, in step S4, the coolant temperature drop value ΔT is set to the value of "0" (i.e. ΔT=0) whereupon operation proceeds to step S5.

In subsequent step S5, in order to be used in step S3 to be executed by the control unit 36 for subsequent fuel gas exhaust valve control operation, the current temperature detected value T_LLC is stored in the memory (not shown) as the preceding coolant temperature detected value T_LLCold (i.e. T_LLCold=T_LLC) whereupon the flow is routed to step S6.

In next step S6, the discrimination is implemented by the control unit 36 to see whether the coolant temperature drop value ΔT calculated in or settled in step S3 or step S4 is equal to or less than a predetermined coolant temperature drop threshold dT_thlev (i.e ΔT≦dT_thlev), thereby estimating the occurrence of the water-clogging phenomenon in the fuel cell stack 11 for executing the discrimination as to whether to open the hydrogen gas exhaust valve 26. Here, both the coolant temperature drop value ΔT and the predetermined coolant temperature drop threshold dT_thlev typically fall in the negative value. Then in step S6, if the discrimination is made by the control unit 36 that the coolant temperature drop value ΔT is equal to or less than the predetermined coolant temperature drop threshold dT_thlev, that is, when the discrimination that the hydrogen gas exhaust valve 26 is to be opened, the flow proceeds to step 57 to control so as to permit the fuel gas exhaust control section 14 of the control unit 36 to open the hydrogen gas exhaust valve 26.

On the contrary, in step S6, if the discrimination is made by the control unit 36 that the coolant temperature drop value ΔT becomes greater than the predetermined coolant temperature drop threshold dT_thlev, that is, when discriminated that the hydrogen gas exhaust valve 26 is not to be opened, the flow is routed to step S8 so as to allow the fuel gas exhaust control section 14 of the control unit 36 not to open the hydrogen gas exhaust valve 26 which in turn remains in a closed state.

Thus, upon execution of the series of operations described above, that is, after operations in step S7 or step S8 have been implemented, current fuel gas exhaust valve control operation is terminated. Also, operations in steps S1 to S6 set forth above are executed by the water-clogging estimating section 13 of the control unit 36.

Now, the predetermined coolant temperature drop threshold dT_thlev used in step S6 is described below in detail with reference to FIGS. 5A to 5E.

FIG. 5A is a timing chart of the electric power output of the fuel cell stack for illustrating fuel gas exhaust valve control operation of the fuel cell system, with the abscissa representing time interval t while the ordinate represents the electric power output Pw_STACK of the fuel cell stack. FIG. 5B is a timing chart of the coolant temperature of the fuel cell stack, with the abscissa representing time interval t while the ordinate represents the coolant temperature T_LLC of the fuel cell stack. FIG. 5C is a timing chart of a vehicle speed, with the abscissa representing time interval t while the ordinate represents the vehicle speed VSP. FIG. 5D is a timing chart of a minimal cell voltage, with the abscissa representing time interval t while the ordinate represents the minimal cell voltage VC. FIG. 5E is a timing chart related to operation of the fuel gas exhaust valve, with the abscissa representing time interval t while the ordinate represents an opening and closing state of the fuel gas exhaust valve of the fuel cell system.

Such a threshold dT_thlev has a predetermined value to allow the discrimination to be made to see whether the coolant temperature T_LLC rapidly drops to a lower value than the preceding coolant temperature T_LLCold. In particular, though depending on an operating time interval of fuel gas exhaust valve control operation, if the discrimination is made that ΔT reaches or exceeds the temperature drop (i.e. dT_thlev=−1° C./s) at the rate of 1° C. per one second, it is probable for the condensed water to occur inside the fuel cell stack 11 due to rapid temperature drop in the fuel cell stack 11 and the estimation is thus executed that the water-clogging phenomenon will take place in the fuel cell stack 11.

That is, in the fuel cell system 2 which performs fuel gas exhaust valve control operation set forth above, at a time instant before time t1, the electric power output Pw_STACK of the fuel cell stack 11 shown in FIG. 5A remains under a high load condition as at P1, and the coolant temperature T shown in FIG. 5B remains at T1. When this takes place, the electric power output V1 is applied from the fuel cell stack 11 to the electric motor 3 and, hence, the fuel cell powered vehicle 1 is accelerated under a situation where the vehicle speed VSP gradually increases from v0 as shown in FIG. 5C.

And, at time t1, if vehicle operation is performed so as to interrupt acceleration of the fuel cell powered vehicle 1 and to commence to allow the vehicle to travel at a cruising speed, the control unit 36 operates to lower the hydrogen gas supply flow rate and the hydrogen gas pressure by controlling the hydrogen pressure regulating valve 22 for the purpose of lowering the electric power output Pw_STACK of the fuel cell stack 11, while controlling the compressor 27 and the air pressure regulating valve 30 to lower the air supply flow rate and the air pressure and, further, controlling the pump 22 to decrease the coolant circulation flow rate. Then, as shown in FIG. 5A, the electric power output Pw_STACK of the fuel cell stack 11 begins to drop from P1 to P2 accompanied by an increase in the minimal cell voltage VC from VCO as shown in FIG. 5D.

Subsequently, at time t2, when the electric power output Pw_STACK, shown in FIG. 5A, of the fuel cell stack 11 rapidly drops from P1 to P2, the vehicle speed VSP still remains at the high level and, hence, the coolant temperature T_LLC shown in FIG. 5B begins to rapidly drop from T1.

When this occurs, as a result of calculation being executed in step S3 shown in FIG. 4, the control unit 36 discriminates that the coolant temperature drop value ΔT (in negative value) is equal to or less than the threshold dT_thlev (i.e. dT_thlev =−1° C./s) and estimates the occurrence of the water-clogging phenomenon whereupon at time t3, the hydrogen gas exhaust valve 26 is brought into the open condition as shown in FIG. 5E. This causes the coolant temperature T_LLC to further drop after time t2 such that, even when the condensed water results in the fuel gas flow passage of the fuel cell stack 11, it becomes possible for the condensed water to be exhausted to the outside after time t3. Also, at time t4 after an elapse of a given time interval from time t3, the control unit 36 restores the hydrogen gas exhaust valve 26 to its closed condition.

On the contrary, suppose that control is executed aiming at only the minimal cell voltage of the fuel cell stack 11 without depending upon the above-described structure. That is, suppose a structure is employed wherein when the minimal cell voltage of the fuel cell voltage is detected and the discrimination is made that the water-clogging phenomenon has occurred when the minimal cell voltage of the fuel cell voltage is lowered by a given value, the hydrogen gas exhaust valve 26 is brought into the open condition, as shown by a dotted line in FIG. 5D, due to finally beginning of drop in the minimal cell voltage at time t11 subsequent to actual occurrence of the condensed water resulting from rapid drop in the coolant temperature after time t2, it is hard to commence purging of the condensed water resulted in the fuel gas flow passage, provided the minimal cell voltage has dropped to some extent in such a way as shown by a dotted line in FIG. 5E. Accordingly, with the structural example aiming at only such a minimal cell voltage, it is conceived that, in a case where the condensed water flows at a large flow rate in the fuel gas flow passage at once, purging of the condensed water does not fall in time to cause the drop in the cell voltage of the fuel cell stack 11 to rapidly progress and, in an extremely case, it is probable for the cell voltage to drop to zero.

As set forth above, according to the fuel cell system and the related method of the presently filed embodiment, since the estimation is made that a large amount of the condensed water results in the fuel gas flow passage inside the fuel cell stack at a timing that the coolant temperature of the fuel cell stack drops or the electric power output of the fuel cell stack decreases and the hydrogen gas exhaust valve is brought into the open condition, the condensed water is prevented from staying in the fuel cell stack to enable the cell voltage from dropping, resulting in a capability of preventing an electric power generating efficiency from being deteriorated to a minimal extent.

Second Embodiment

Figure 6:
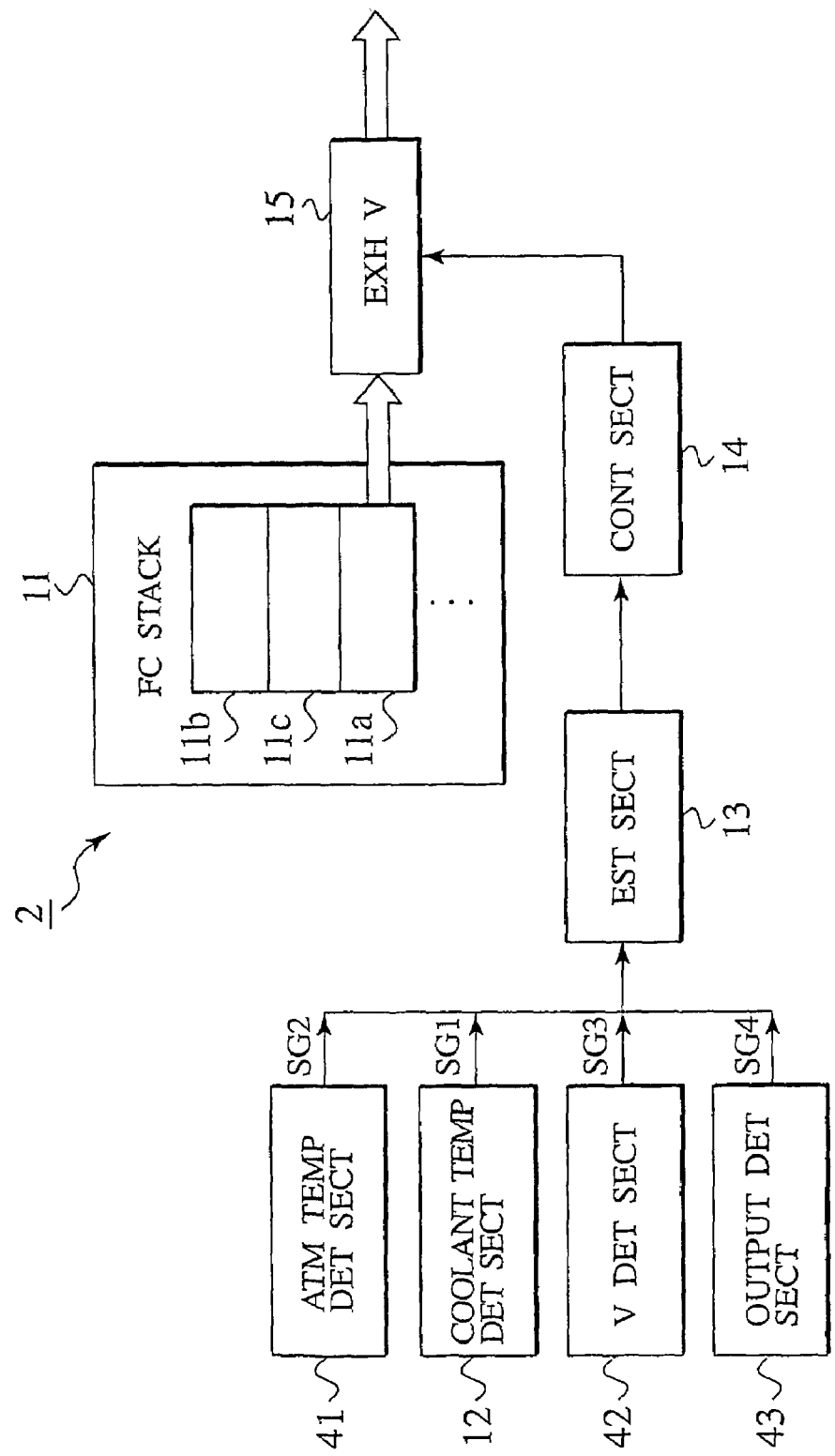
FIG. 6 is a block diagram illustrating a functional structure of a fuel cell system of a second embodiment according to the present invention.
Figure 7:
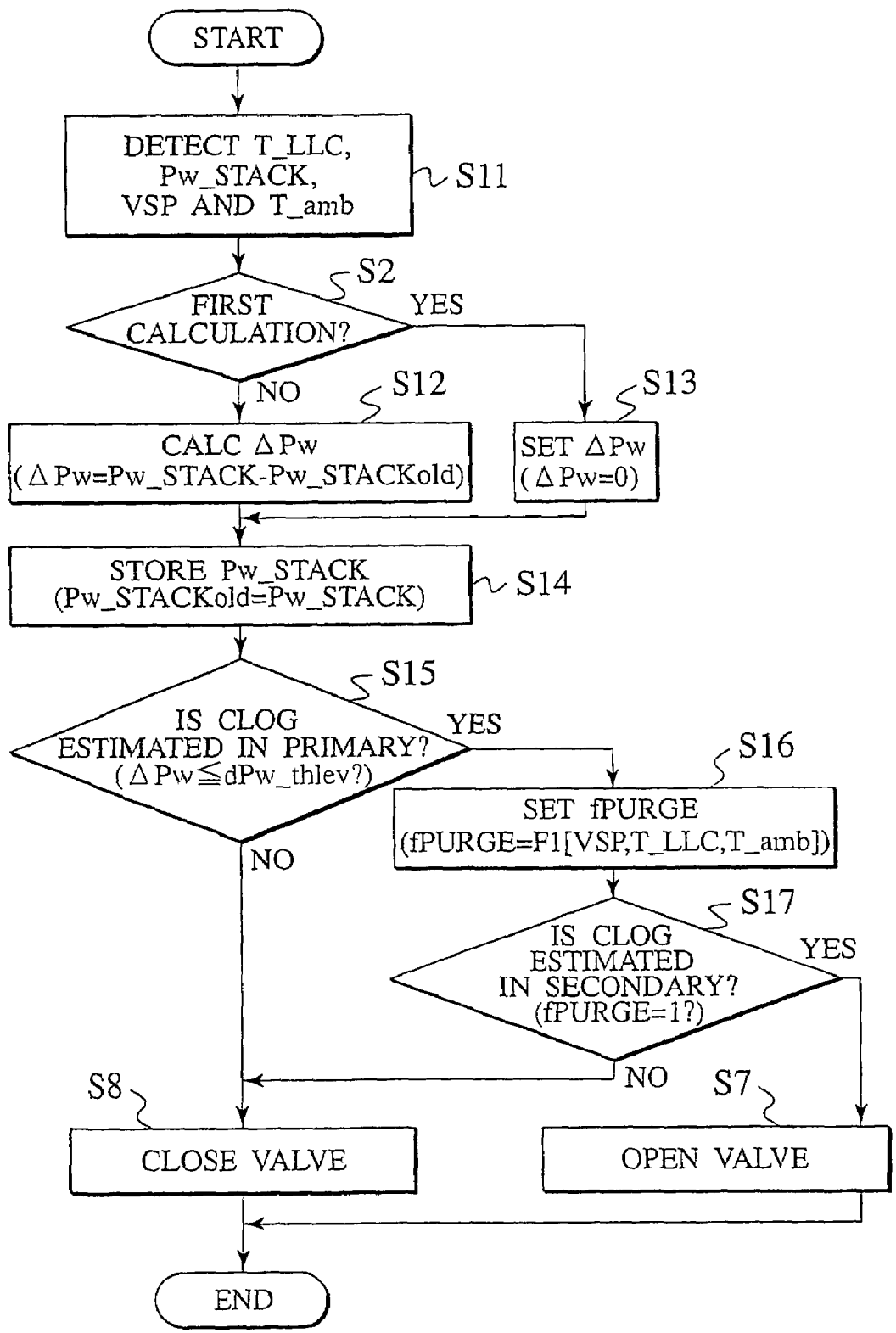
FIG. 7 is a flowchart illustrating an operational sequence of fuel gas exhaust valve control operation to be performed by the fuel cell system of the present embodiment.
Figure 8:
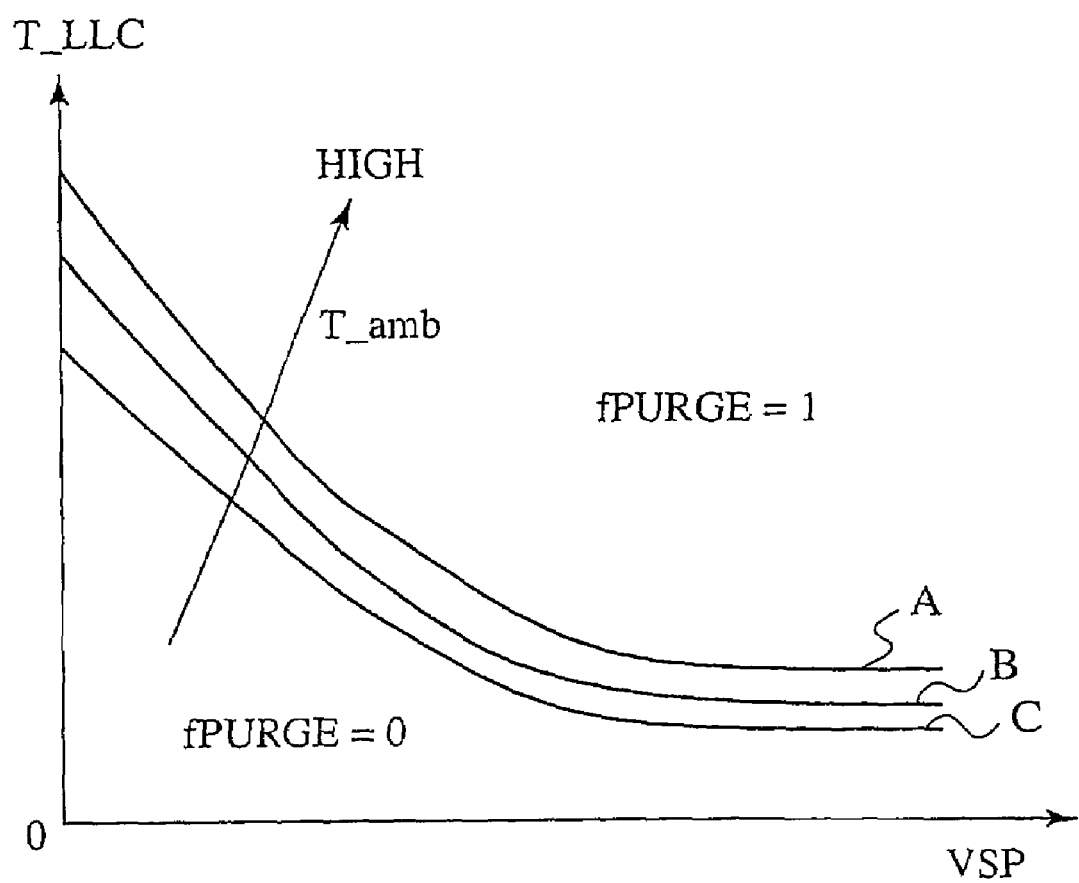
FIG. 8 is a view for illustrating map data that varies a water-clogging occurrence estimation flag depending on the coolant temperature in terms of an atmospheric air temperature and a vehicle speed, with the abscissa representing the vehicle speed VSP while the ordinate represents the coolant temperature T_LLC in the present embodiment.

Next, a control device of a fuel cell system and its related method of a second embodiment according to the present invention are described in detail mainly with reference to FIGS. 6 to 8. Also, the same component parts as those of the first embodiment set forth above bear the same reference numerals to omit detailed description of these components.

FIG. 6 is a block diagram illustrating a functional structure of the fuel cell system according to the presently filed embodiment.

As shown in FIG. 6, the fuel cell system 2 of the presently filed embodiment fundamentally has the same structure as that of the first embodiment and differs from the first embodiment in that the fuel cell system 2 additionally includes an atmospheric air temperature detecting section 41, a vehicle speed detecting section 42 that detects a vehicle speed of the fuel cell powered vehicle 1 and a stack power output detecting section 43 that detects the power output of the fuel cell stack 11.

With such a fuel cell system 2, the water-clogging estimating section 13 of the control unit 36 estimates the occurrence of the water-clogging phenomenon using, in addition to the coolant temperature detected by the coolant temperature detecting section 12, the atmospheric air temperature detected by the atmospheric air temperature detecting section 41, the vehicle speed detected by the vehicle speed detecting section 42 and the stack power output detected by the stack power output detecting section 43.

Hereinafter, fuel gas exhaust valve control operation of the presently filed embodiment is described with reference to FIGS. 7 and 8.

FIG. 7 is a flowchart illustrating an operational sequence of the fuel gas exhaust valve control operation of the fuel cell system of the presently filed embodiment.

As shown in FIG. 7, first in step S11, the control unit 36 reads in, in addition to the stack coolant temperature T_LLC a sensor signal SG2 delivered from the atmospheric air temperature detecting section 41 to detect the atmospheric air temperature T_amb reads in a sensor signal SG3 delivered from the vehicle speed detecting section 42 to detect the vehicle speed VSP and reads in a sensor signal SG4 delivered from the stack power output detecting section 43 to detect the fuel cell stack power output Pw_STACK whereupon the flow proceeds to step S2.

In next step S2, when discriminated that no first calculation is involved, in consecutive step S12, calculation is executed to provide a stack power output drop value ΔPw. In particular, the control unit 36 executes the calculation of a difference between the preceding fuel cell stack power output Pw_STACKold and the current fuel cell stack power output Pw_STACK detected in step S11 to calculate the stack power output drop value ΔPw (i.e. ΔPw=Pw_STAC-Pw_STACKold), whereupon operation proceeds to step S14. Here, if the current fuel cell stack power output Pw_STACK drops below the preceding fuel cell stack power output Pw_STACKold, the stack power output drop value ΔPw falls in a negative value. On the contrary, in step S2, when discriminated that the first calculation is involved, in consecutive step S13, the stack power output drop value ΔPw is initialized to "0" (i.e. ΔPw=0), and operation is routed to step S14.

In subsequent step S14, the current fuel cell stack power output Pw_STACK is stored in the memory (not shown) (i.e. Pw_STACKold=Pw_STACK) to be used in subsequent operation.

In succeeding step S15, the control unit 36 executes the discrimination as to whether the stack power output drop value ΔPw is equal to or less than a predetermined stack power output drop threshold dPw_thlev (i.e. ΔPw≦dPw_thlev), implementing a first water-clogging estimation. When discriminated that the stack power output drop value ΔPw is equal to or less than the predetermined stack power output drop threshold dPw_thlev, the flow is routed to step S16 and, in contrast, when discriminated that the stack power output drop value ΔPw is greater than the predetermined stack power output drop threshold dPw_thlev, the flow is routed to step S8 in which the fuel gas exhaust control section 14 of the control unit 36 compels the hydrogen gas exhaust valve 26 to remain in the closed condition.

Here, the stack power output drop threshold dPw_thlev is set to have a value for executing the discrimination as to whether the fuel cell stack power output Pw_STACK is caused to rapidly drop to a lower value than the preceding fuel cell stack power output Pw_STACKold. In particular, though depending on a time interval in which such fuel gas exhaust valve control operation is executed, when discriminated that the power output drop has resulted or exceeded a value of approximately 30 kW (i.e. Pw_thlev=−30 kW/s) for a time interval of one second, the discrimination is made that the heat value of the fuel cell stack 11 has rapidly dropped.

Subsequently, in case where operation proceeds to step 516, the control unit 36 executes operation in step S16 to set the water-clogging occurrence estimation flag fPURGE (i.e. fPURGE=F1[VSP, T_LLC, T_amb]) for the purpose of executing a second water-clogging estimating operation (step S17) that allows the occurrence of the water-clogging phenomenon of the fuel cell stack 11 to be estimated on the basis of map data, shown in FIG. 8, correlated with the vehicle speed VSP, the coolant temperature T_LLC and the atmospheric air temperature T_amb detected in step S11. Also, such map data is stored in the memory (not shown) of the control unit 36.

FIG. 8 is a view illustrating map data wherein the water-clogging occurrence estimation flag varies in dependence on the coolant temperature related to the atmospheric air temperature and the vehicle speed used in step S16, with the abscissa representing the vehicle speed VSP while the ordinate represents the coolant temperature T_LLC.

That is, in step S16, the control unit 36 refers to map data describing the relationship between the vehicle speed and the coolant temperature T_LLC that are determined for each atmospheric temperature T_amb as shown in FIG. 8.

In FIG. 8, map data is set to have characteristics of the coolant temperature T_LLC in terms of the vehicle speed VSP for each atmospheric air temperature T_amb. In the presently filed embodiment, three curves are plotted which include a characteristic A of the coolant temperature T_LLC in terms of the vehicle speed VSP in a high temperature range of the atmospheric air temperature T_amb, a characteristics B of the coolant temperature T_LLC in terms of the vehicle speed VSP in an intermediate temperature range of the atmospheric air temperature T_amb and a characteristics C of the coolant temperature T_LLC in terms of the vehicle speed VSP in a low temperature range of the atmospheric air temperature T_amb.

More particularly, with the control unit 36, in each characteristic for each atmospheric temperature T_amb in FIG. 8, if the coolant temperature T_LLC detected in step S11 is greater than the coolant temperature T_LLC in terms of the vehicle speed VSP, the water-clogging occurrence estimation flag fPURGE is set equal to "1". On the contrary, if the coolant temperature T_LLC detected in step S11 is less than the coolant temperature T_LLC in terms of the vehicle speed VSP, the water-clogging occurrence estimation flag fPURGE is set to "0". That is, during such operation, the control unit 36 executes the estimation of occurrence of the water-clogging phenomenon in subsequent step S17 using that the higher the vehicle speed VSP and the coolant temperature T_LLC in terms of the vehicle speed VSP, the higher will be the probabilities of occurrences of the condensed water formation and the water-clogging phenomenon.

In succeeding step S17, operation is implemented to execute a second water-clogging estimating operation in which the discrimination is made to see whether the value of the water-clogging occurrence estimation flag fPURGE set in step S16 falls in "1". When discriminated that the value of the water-clogging occurrence estimation flag fPURGE set in step S16 remains at "1" (i.e. fPURGE=1), the occurrence of the water-clogging phenomenon is estimated, and operation is routed to step S7, wherein the fuel gas exhaust control section 14 of the control unit 36 renders the hydrogen gas exhaust valve 26 to be opened for purging. In contrast, when discriminated that the value of the water-clogging occurrence estimation flag fPURGE set in step S16 does not remain at "1" (i.e. fPURGE=0), the estimation is made that no water-clogging phenomenon occurs and operation proceeds to step S8.

In succeeding step S8, the fuel gas exhaust control section 14 of the control unit 36 renders the hydrogen gas exhaust valve 26 to remain in the closed condition.

Then, after an elapse of the series of operations set forth above, that is, after operations in step S7 or step S8 have been executed, current fuel gas exhaust valve control operation is terminated. Also, operations in steps S11 to S17 set forth above are executed in the water-clogging estimating section 13 of the control unit 36.

As previously mentioned above, according to the fuel cell system and the related method of the presently filed embodiment, in case of rapid drop experienced in the fuel cell stack power output, since the occurrence of the water-clogging phenomenon is estimated based on the relationship between the vehicle speed and the coolant water temperature in terms of the atmospheric air temperature, it is possible for the fuel cell system 2 to estimate the occurrence of drop in the electric power output in dependence on the condensed water. Consequently, according to such a fuel cell system, it becomes possible to reliably prevent an electric power generating efficiency of the fuel cell stack from being deteriorated.

Third Embodiment

Next, a control device of a fuel cell system and its related method of a third embodiment of the present invention are described below in detail with references to FIGS. 9 and 10. Also, in the presently filed embodiment, the same component parts as those of the second embodiment bear the same reference numerals to omit detailed description of the same components.

Figure 9:
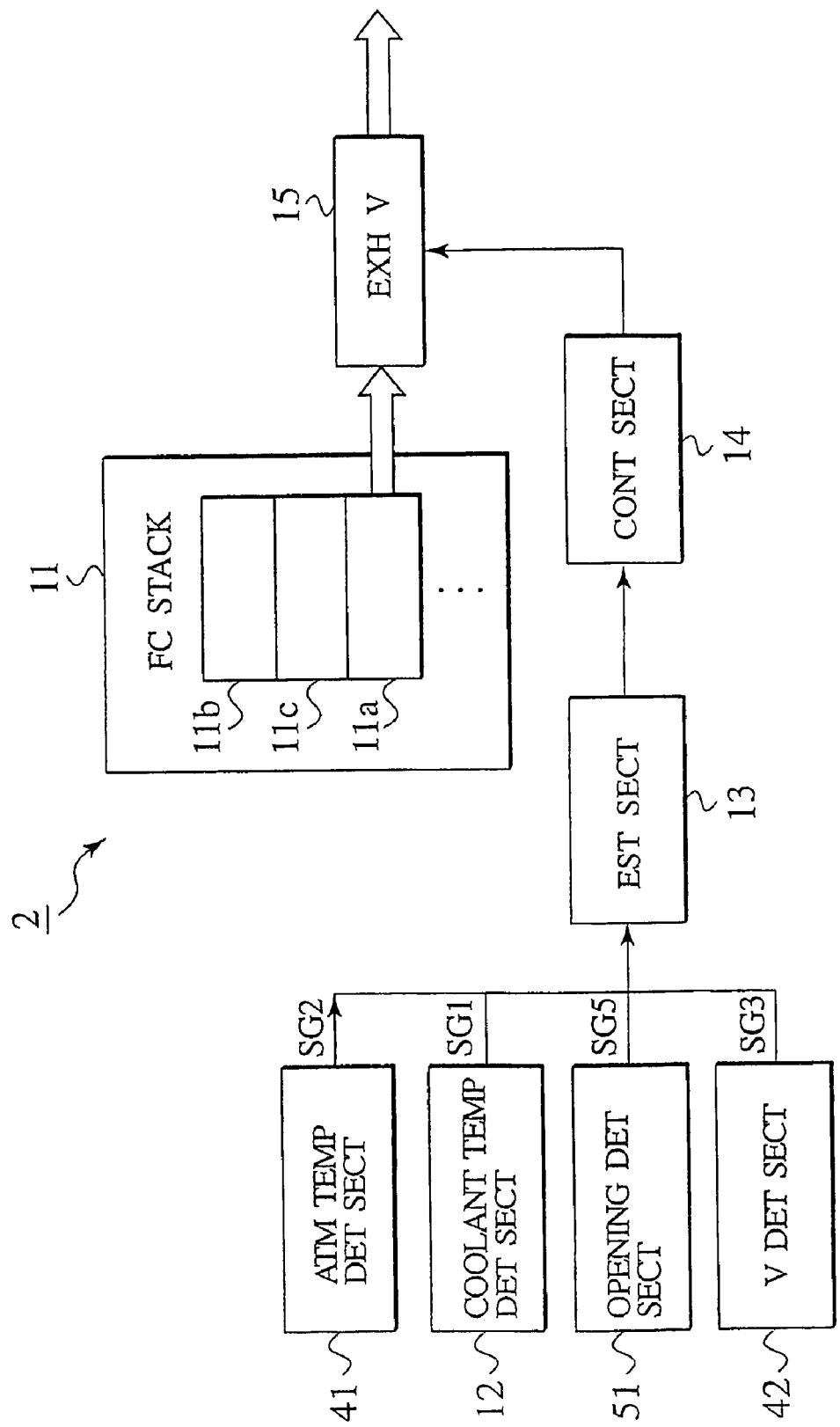
FIG. 9 is a block diagram illustrating a functional structure of a fuel cell system of a third embodiment according to the present invention.

FIG. 9 is a block diagram illustrating a functional structure of a fuel cell system of the present filed embodiment.

As shown in FIG. 9, the fuel cell system 2 of the presently filed embodiment fundamentally has the same structure as that of the second embodiment and differs from the second embodiment in that an accelerator opening detecting section 51, which detects an accelerator opening degree of the fuel cell powered vehicle 1, is used in place of the stack power output detecting section 43 that detects the power output of the fuel cell stack 11.

With such a fuel cell system 2, the water-clogging estimating section 13 of the control unit 36 performs the estimation of the water-clogging phenomenon further using the acceleration opening degree detected by the accelerator opening detecting section 51.

Figure 10:
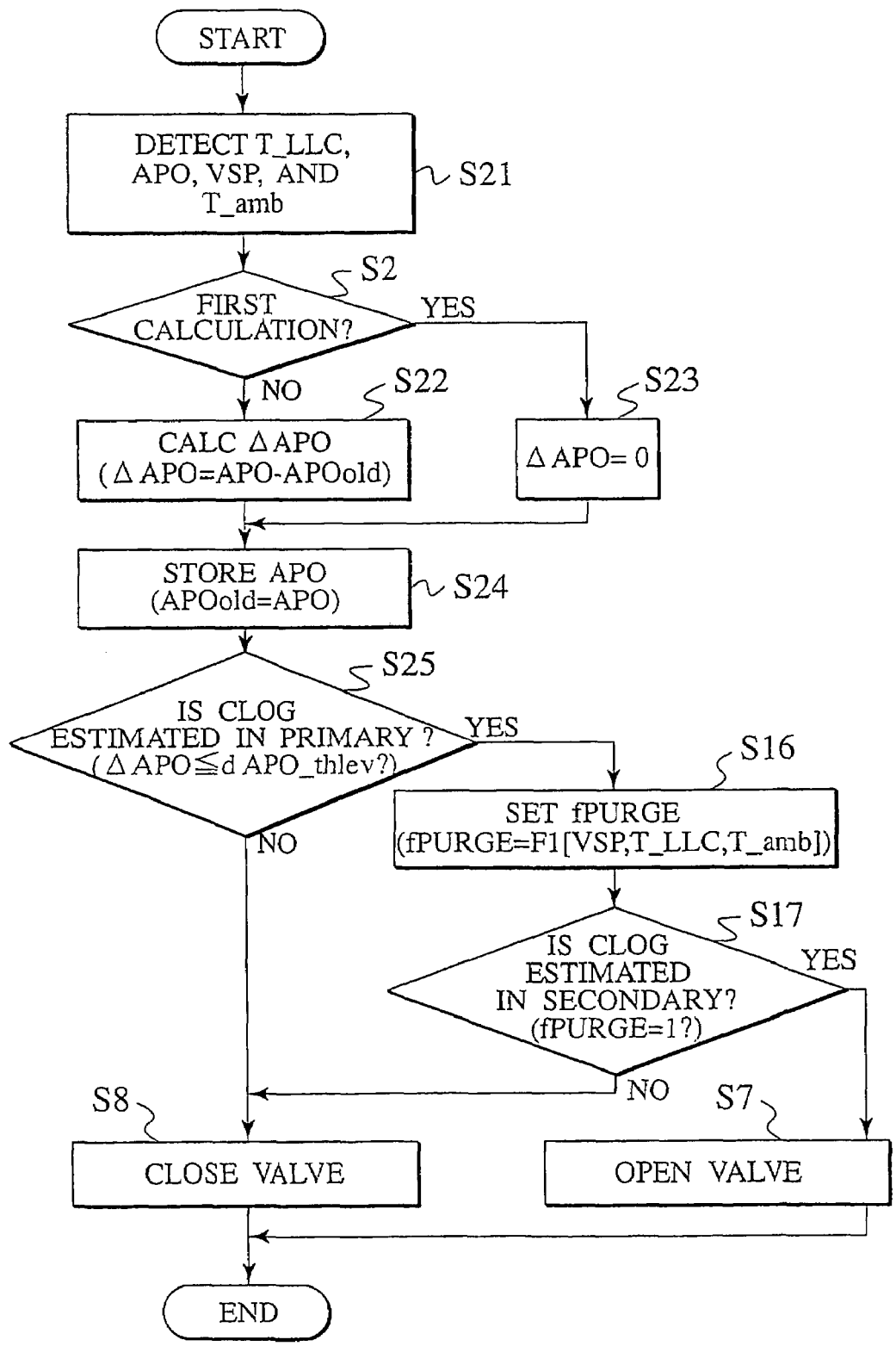
FIG. 10 is a flowchart illustrating an operational sequence of fuel gas exhaust valve control operation to be performed by the fuel cell system of the present embodiment.

As shown in FIG. 10, first in step S21, the control unit 36 reads in, in addition to the stack coolant temperature T_LLC, the sensor signal SG2 delivered from the atmospheric air temperature detecting section 41 to detect the atmospheric air temperature T_amb, reads in the sensor signal SG3 delivered from the vehicle speed detecting section 42 to detect the vehicle speed VSP and reads in the a sensor signal SG5 delivered from the accelerator opening detecting section to detect an accelerator's incremental displacement value APO whereupon the flow proceeds to step S2.

In next step S2, when discriminated that no first calculation is currently involved, in consecutive step S22, calculation is executed to obtain an accelerator's incremental displacement drop value ΔAPO. Here, the control unit 36 executes calculation of a differential component between a preceding accelerator's incremental displacement value APOold and the current accelerator's incremental displacement value APO detected in step S21 to calculate the accelerator's incremental displacement drop value ΔAPO (i.e. ΔAPO=APO−APOold), whereupon operation proceeds to step S24. Here, if the current accelerator's incremental displacement value APO drops below the preceding accelerator's incremental displacement value APOold, the accelerator's incremental displacement drop value ΔAPO falls in a negative value. On the contrary, in step S2, when discriminated that the first calculation is currently involved, in consecutive step S23, the accelerator's incremental displacement drop value ΔAPO is initialized to "0", whereupon the flow is routed to step S24 (i.e. ΔAPO=0).

In subsequent step S24, the current accelerator's incremental displacement value APO is stored in the memory (not shown) (i.e. APOold=APO) to be used in subsequent operation.

In succeeding step S25, the control unit 36 executes the discrimination as to whether the accelerator's incremental displacement drop value ΔAPO is equal to or less than a predetermined accelerator's incremental displacement drop threshold dAPO_thlev (i.e. ΔAPO≦dAPO_thlev), implementing an occurrence of a first water-clogging estimation. When discriminated that the accelerator's incremental displacement drop threshold dAPO is equal to or less than the predetermined accelerator's incremental displacement drop threshold dAPO_thlev, the flow is routed to step S16. On the contrary, when discriminated that the accelerator's incremental displacement drop threshold dAPO is greater than the predetermined accelerator's incremental displacement drop threshold dAPO_thlev, the flow is routed to step S8 in which the fuel gas exhaust control section 14 of the control unit 36 compels the hydrogen gas exhaust valve 26 to remain in the closed condition.

Here, the predetermined accelerator's incremental displacement drop threshold dAPO_thlev is set to a value for enabling the discrimination as to whether the current accelerator's incremental displacement value APO is caused to rapidly drop to a lower value than the preceding accelerator's incremental displacement value APOold. In particular, the predetermined accelerator's incremental displacement drop threshold dAPO_thlev is set to an accelerator's incremental displacement value that causes the heat value of the fuel cell stack 11 to rapidly drop.

Subsequently, when in operation routed to step S16, thereafter, a series of the same steps as those of the second embodiment are executed.

Then, after an elapse of the series of operations set forth above, that is, after operations in step S7 or step S8 have been executed, current fuel gas exhaust valve control operation is terminated. Also, operations in steps S21 to S17 set forth above are executed in the water-clogging estimating section 13 of the control unit 36.

As previously described above, according to the fuel cell system and the related method of the presently filed embodiment, if the current accelerator's incremental displacement value APO, which would cause rapid drop in the heat value of the fuel cell stack to occur accompanied with rapid drop in the fuel cell stack temperature, is detected, the hydrogen gas exhaust valve can be brought into the open condition and, hence, it is possible for the hydrogen gas exhaust valve to be opened prior to an exact probability of the amount of electric power output of the fuel cell stack being lowered to cause drop in the gas temperature, resulting in a capability of avoiding deterioration of an electric power generating efficiency of the fuel cell stack.

Fourth Embodiment

Next, a control device of a fuel cell system and its related method of a fourth embodiment of the present invention are described below in detail with references to FIG. 11. Also, the presently filed embodiment is able to adopt the same structure as that of either one of the embodiments described above and adopt the same steps as either one of the sequences of the steps for estimating the water-clogging phenomenon of the fuel cell stack of the embodiments set forth above, with like component parts bearing like reference numerals to omit detailed description of the same components.

The fuel cell system 2 of the presently filed embodiment differs from the above-described embodiments in that the fuel gas exhaust control section 14 of the control unit 36 is configured so as to execute the purging to allow the hydrogen gas exhaust valve 26 to be regularly opened for a predetermined time interval and is similar in the other structures.

Fuel gas exhaust valve control operation of such a fuel cell system 2 is described with reference to a flowchart of FIG. 11.

Figure 11:
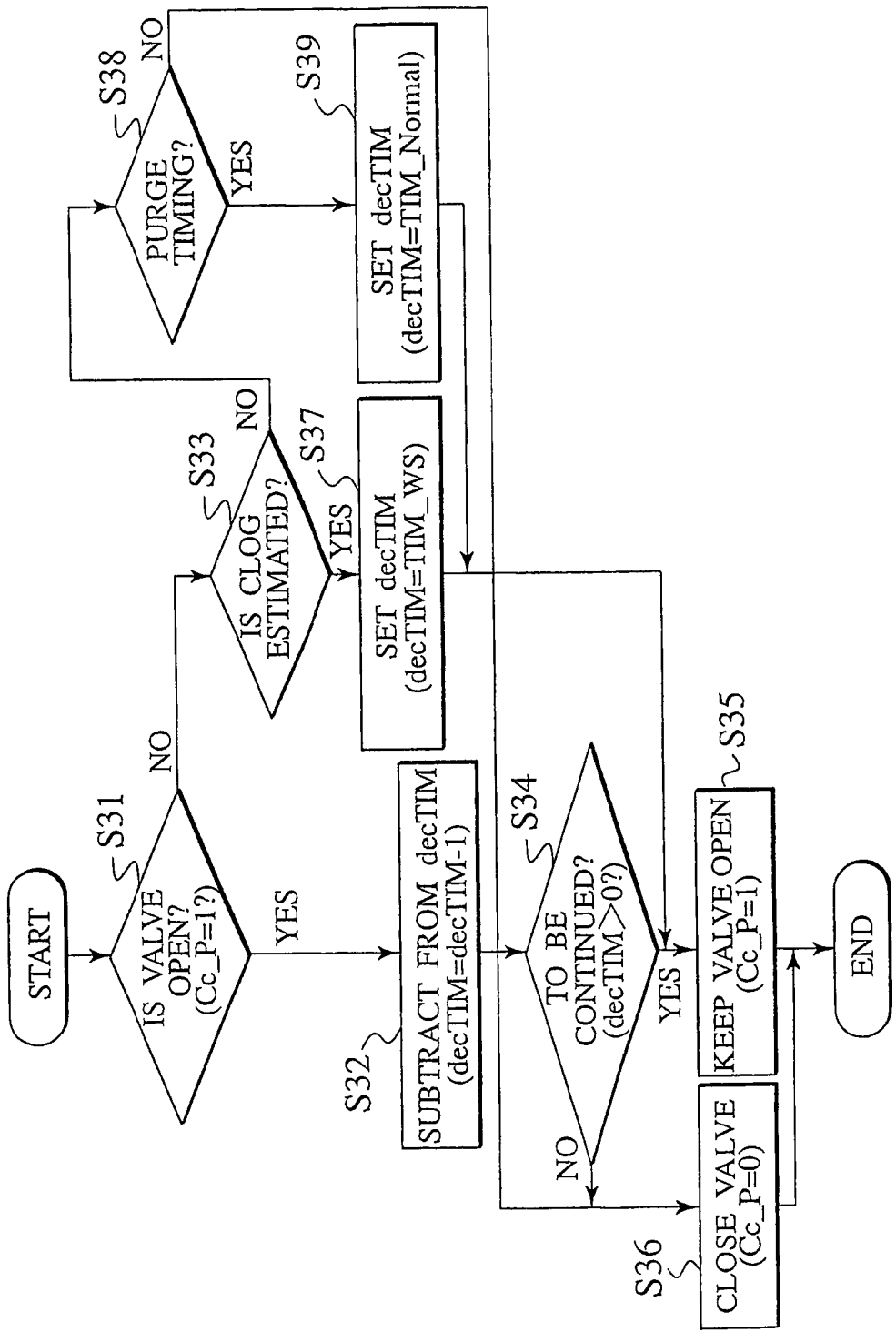
FIG. 11 is a flowchart illustrating an operational sequence of fuel gas exhaust valve control operation to be performed by a fuel cell system of a fourth embodiment according to the present invention.

FIG. 11 is the flowchart illustrating an operational sequence of fuel gas exhaust valve control operation of the fuel cell system of the presently filed embodiment.

As shown in FIG. 11, first in step S31, the control unit 36 executes the discrimination to find if a value of the fuel gas exhaust valve opening and closing flag Cc_P has a value of "1" by referring to the value of the fuel gas exhaust valve opening and closing flag Cc_P, thereby implementing the discrimination as to whether the hydrogen gas exhaust valve 26 remains in the opened condition. When discriminated that the hydrogen gas exhaust valve 26 remains in the opened condition (i.e. Cc_P=1), the flow proceeds to S32 and conversely, when discriminated that the hydrogen gas exhaust valve 26 does not remain in the opened condition (i.e. Cc_P=0), the flow proceeds to step S33.

In next step S32, the control unit 36 executes subtracting operation from a value decTIM of a predetermined exhausting time interval calculation timer (not shown), thereby calculating the value decTIM−1 (i.e. decTIM=decTIM−1) whereupon the flow proceeds to step S34.

In subsequent step S34, the discrimination is executed to find if the resulting value of decTIM of the exhausting time interval calculation timer subjected to subtraction is greater than "0", thereby discriminating to see whether the hydrogen gas stands still to be exhausted. When discriminated that the value decTIM of the exhausting time interval calculation timer is greater than "0" (i.e. decTIM>0) and the hydrogen gas continues to be exhausted, the flow proceeds to step S35, wherein operation is executed to maintain the hydrogen gas exhaust valve 26 in the open condition while keeping the fuel gas exhaust valve opening and closing flag Cc_P at "1" (i.e. Cc_P=1). On the contrary, when discriminated that the value decTIM of the exhausting time interval calculation timer is not greater than "0" (i.e. decTIM≦0) and the hydrogen gas is not to be exhausted, the flow proceeds to step S36, wherein operation is executed to maintain the hydrogen gas exhaust valve 26 in the closed condition while keeping the fuel gas exhaust valve opening and closing flag Cc_P to be reset to "0" (i.e. Cc_P=0).

In contrast, in step S33 to which operation proceeds when discriminated in step S31 that the hydrogen gas exhaust valve 26 is closed, the control unit 36 executes the water-clogging phenomenon of the fuel cell stack 11. When this takes place, the control unit 36 performs the same operations as either one of the sequences of the steps for estimating the water-clogging phenomenon of the aforementioned first to third embodiments, thereby estimating the water-clogging phenomenon occurring in the fuel cell stack 11. In step S33, if the occurrence of the water-clogging phenomenon is estimated, the flow proceeds to step S37 and conversely, if no water-clogging phenomenon is estimated, the flow proceeds to step S38.

In subsequent step S37, the value decTIM of the exhausting time interval calculation timer is set to a predetermined value TIM_WS (i.e. decTIM=TIM_WS) for determining the time interval in which the hydrogen gas exhaust valve 26 is rendered to fall in the open condition, and operation proceeds to step S35. The predetermined value TIM_WS is determined to be an adequate time interval necessary for forestalling the staying of the condensed water during occurrence of the water-clogging phenomenon inside the fuel cell stack 11 or an adequate time interval necessary for overcoming the water-clogging phenomenon during occurrence of the water-clogging phenomenon.

On the contrary, in step S33, when estimated that no water-clogging phenomenon is prevailed, the flow is routed to step S38, executing the discrimination to find if a regular purge timing appears in which the hydrogen gas exhaust valve 26 is brought into the open condition. When discriminated that a need for the regular purge timing is found, the flow proceeds to step S39, wherein the value decTIM of the exhausting time interval calculation timer is set to a given value TIM_Normal (i.e. decTIM=TIM_Normal), and operation proceeds to step S35. Here, the given value TIM_Normal is set to a time interval that is shorter than the given value TIM_WS appearing when estimated that the water-clogging phenomenon is prevailed. In step S38, further, when discriminated that there is no purge timing for regularly rendering the hydrogen gas exhaust valve 26 to fall in the open condition, the flow proceeds to step S36.

Then, after an elapse of the series of operations set forth above, that is, after operations in step S35 or step S36 have been executed, current fuel gas exhaust valve control operation is terminated. Also, operation in steps S33 set forth above is executed in the water-clogging estimating section 13 of the control unit 36 and the other operations are executed by the fuel gas exhaust control section 14 of the control unit 36.

As previously set forth above, according to the fuel cell system and the related method of the presently filed embodiment, when estimated that the water-clogging phenomenon will occur in the fuel cell stack, operation is so executed as to extend the hydrogen gas exhausting time interval to a value longer than the hydrogen gas exhausting time interval appearing in the regular purge timing to increase the amount of the hydrogen gas to be exhausted when estimated that the water-clogging phenomenon will occur, resulting in a capability of avoiding a probability where a large volume of the condensed water is formed in the hydrogen gas flow passage accompanied by the flow of the condensed water into the fuel cell stack.

Fifth Embodiment

Next, a control device of a fuel cell system and its related method of a fifth embodiment of the present invention are described below in detail mainly with references to FIG. 12. Also, in the presently filed embodiment, the same component parts as those of the fourth embodiment bear the same reference numerals to omit detailed description of the same components.

The fuel cell system 2 of the presently filed embodiment differs from the fourth embodiment in that when the occurrence of the water-clogging phenomenon is estimated by the control unit 36, the coolant temperature appearing at that time instant is stored whereby after the hydrogen gas exhaust valve 26 has been opened, if the temperature prevailing when the occurrence of the water-clogging phenomenon is reached, the hydrogen gas exhaust valve 26 is brought into the closed condition, and is similar to the fourth embodiment in the other structures.

Fuel gas exhaust valve control operation of such a fuel cell system 2 is described with reference to a flowchart of FIG. 12.

Figure 12:
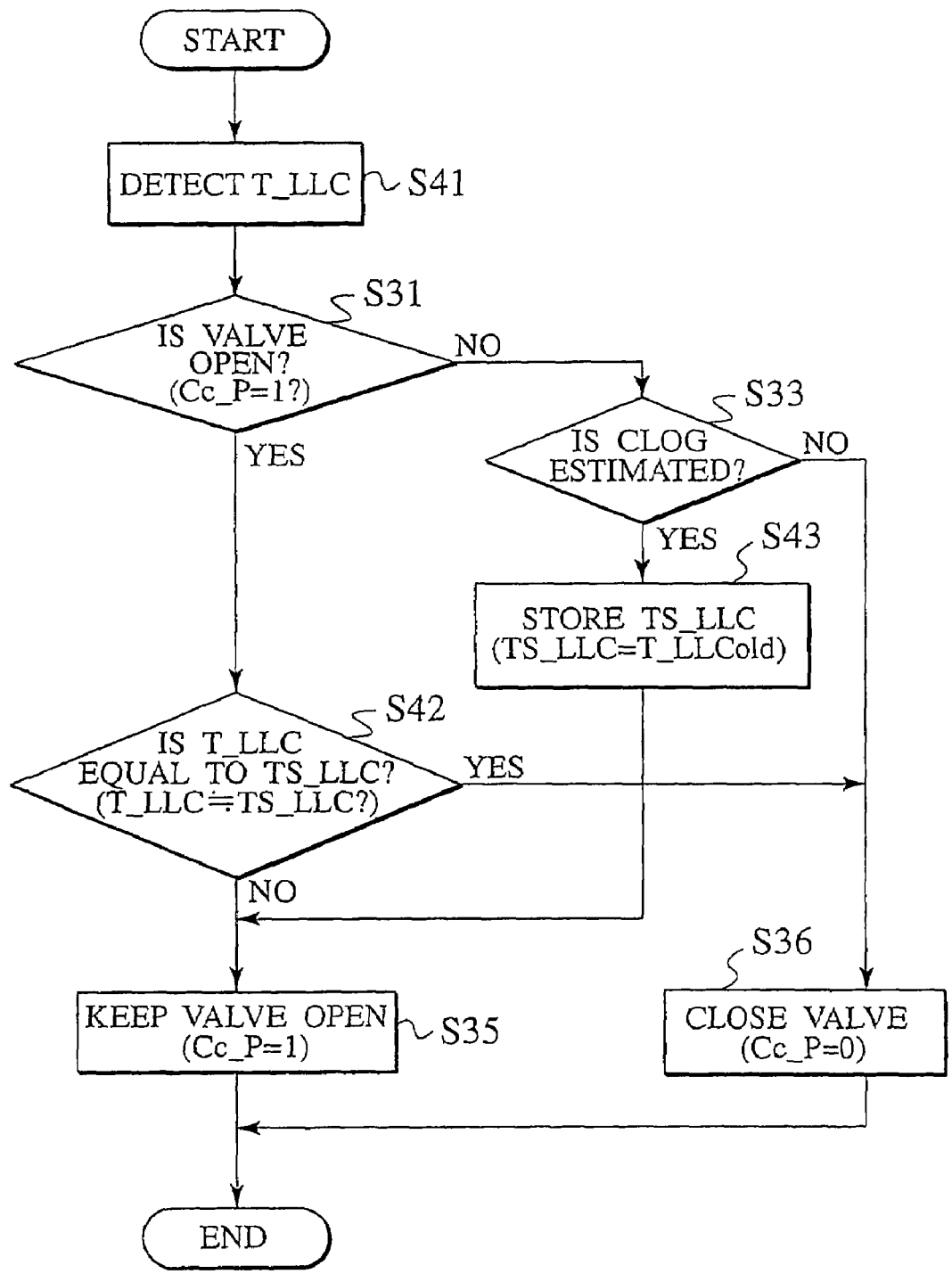
FIG. 12 is a flowchart illustrating an operational sequence of fuel gas exhaust valve control operation to be performed by a fuel cell system of a fifth embodiment according to the present invention.

FIG. 12 is the flowchart illustrating an operational sequence of fuel gas exhaust valve control operation of the fuel cell system of the presently filed embodiment.

As shown in FIG. 12, first in step S41, the control unit 36 reads in the sensor signal SG1 delivered from the coolant temperature detecting section 12 to detect the current coolant temperature T_LLC.

In next step S31, the discrimination is executed to find if a value of the fuel gas exhaust valve opening and closing flag Cc_P falls in "1", and if the hydrogen gas exhaust valve 26 is discriminated to remain in the open condition (i.e. Cc_P=1), the flow proceeds to step S42. Conversely, when discriminated that there is no open condition (i.e. Cc_P=0), the flow proceeds to step S33.

In next step S42, the control unit 36 executes the discrimination to find if the coolant temperature T_LLC detected in step S41 is equal to the coolant temperature TS_LLC prevailing during the water-clogging phenomenon. In this instance, if the discrimination is made that both the temperatures are equal to one another (i.e. T_LLC≈TS_LLC), the flow proceeds to step S36 to close the hydrogen gas exhaust valve 26. Conversely, if the discrimination is made that both the temperatures are not equal to one another (i.e. T_LLC≠TS_LLC), the flow proceeds to step S35 to allow the hydrogen gas exhaust valve 26 to remain in the open condition (i.e. Cc_P=1). Of course, in this case, it is not objectionable to discriminate that, in consideration of allowable tolerances, both temperatures are found to be equal to one another when the coolant temperature T_LLC is substantially equal to the coolant temperature TS_LLC prevailing during the water-clogging phenomenon.

In the meantime, in step S33 to which the flow is routed when discriminated in step S31 that the hydrogen gas exhaust valve 26 is closed, the control unit 36 estimates the occurrence of the water-clogging phenomenon of the fuel cell stack 11. When discriminated that no occurrence of the water-clogging phenomenon is estimated, the hydrogen gas exhaust valve 26 is commanded to remain in the closed condition in step S36 and in contrast, if the occurrence of the water-clogging phenomenon is estimated, the flow is routed to step S43. In this instance, the water-clogging phenomenon is estimated through execution of the same operations as either one of the sequences of the steps for estimating the water-clogging phenomenon of the fuel cell stack of the embodiments set forth above.

In subsequent step S43, the control unit 36 stores the temperature value T_LLCold in the memory (not shown) as the coolant temperature TS_LLC causing the water-clogging phenomenon (i.e. TS_LLC=T_LLCold), and the flow proceeds to step S35.

Then, after an elapse of the series of operations set forth above, that is, after operations in step S35 or step S36 have been executed, current fuel gas exhaust valve control operation is terminated. Also, operation in steps S33 set forth above is executed in the water-clogging estimating section 13 of the control unit 36 and the other operations are executed by the fuel gas exhaust control section 14 of the control unit 36.

As previously set forth above, according to the fuel cell system and the related method of the presently filed embodiment, the temperature value prevailing when the water-clogging phenomenon is estimated is stored to allow the hydrogen gas exhaust valve to remain in the closed condition when the coolant temperature becomes substantially equal to such a temperature value whereby the hydrogen gas exhaust valve can be kept in the open condition until the discrimination is made that the fuel cell stack temperature is restored to such a temperature value prevailing when the water-clogging phenomenon is estimated. Accordingly, with such a structure, not only less probability for a large amount of the condensed water to occur in the fuel cell stack, but also, the fuel gas exhaust can be stopped, resulting in a capability of preventing fuel gas from being discharged while minimizing a probability of deterioration of a fuel consumption performance.

Sixth Embodiment

Next, a control device of a fuel cell system and its related method of a sixth embodiment of the present invention are described below in detail mainly with references to FIGS. 13 to 17. Also, although the presently filed embodiment differs from the embodiments set forth above and concerns to an output control operation to be executed by the fuel cell system in parallel with either one of the above-described fuel gas exhaust valve control operations, among these, it is possible for the presently filed embodiment to adopt the same step as that of either one of the steps of estimating the water-clogging phenomenon of the fuel cell stack 11 of the first to third embodiments previously mentioned. In the presently filed embodiment, like component parts bear the same reference numerals to omit detailed description of the same components.

Figure 13:
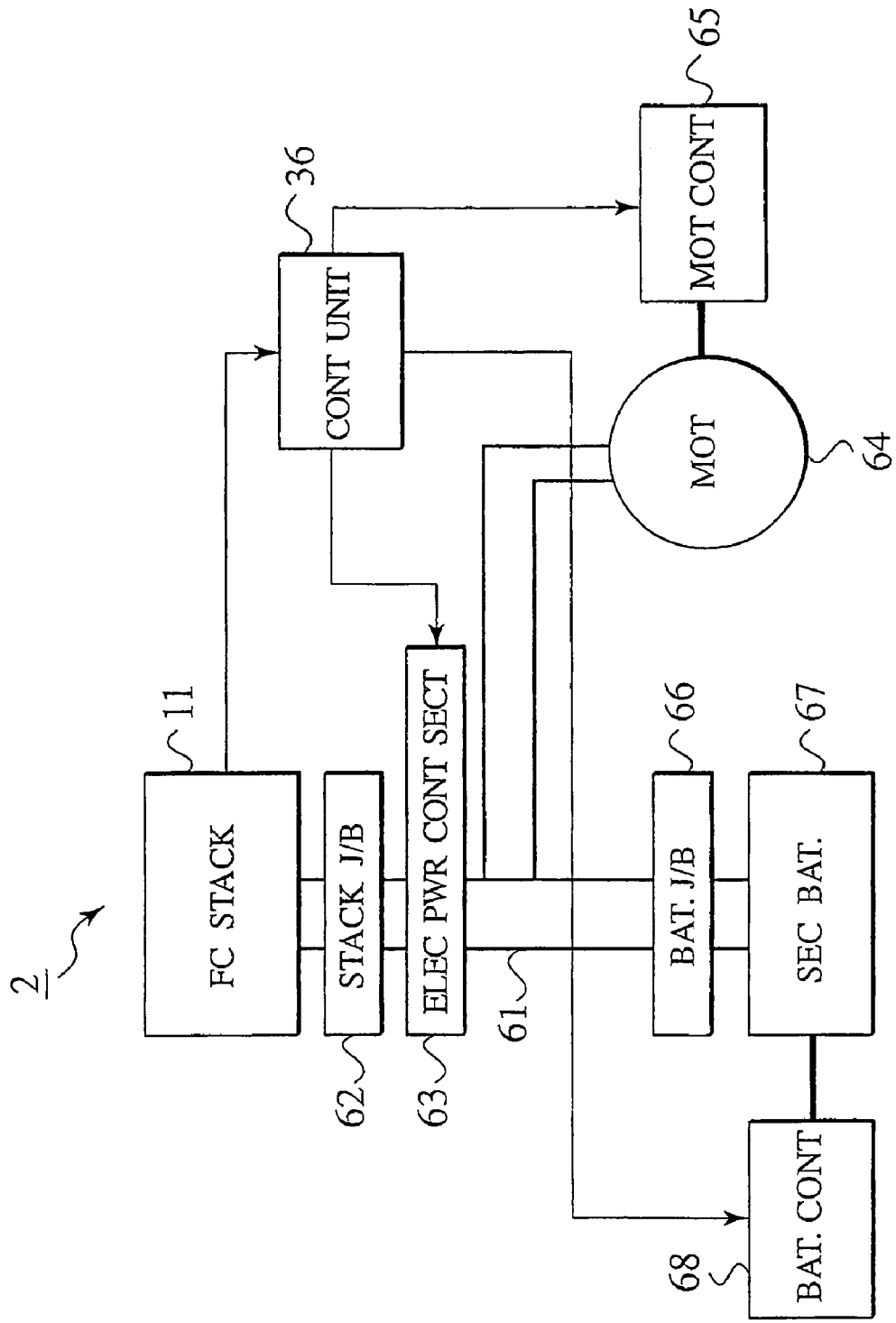
FIG. 13 is a block diagram illustrating a structure of a fuel cell system according to a sixth embodiment according to the present invention.

FIG. 13 is a block diagram illustrating a structure of a fuel cell system according to the presently filed embodiment.

As shown in FIG. 13, the fuel cell stack 11 of the fuel cell system 2 of the presently filed embodiment is connected to a stack J/B (Junction Box) 62 and an electric power control section 63 through a high voltage line 61. An electric power output generated by the fuel cell stack 11 is supplied to the stack J/B 62 with the voltage being regulated by the electric power control section 63, which is controlled by the control unit 36, whereupon the regulated voltage is supplied to a drive motor 64 and a battery J/B 66. As a result, the drive motor 64 is driven in accordance with control of a motor controller 65, which is controlled by the control unit 36, to generate an output torque required for driving the fuel cell powered vehicle 1. On the other hand, the electric power output supplied to the battery J/B 66 is supplied to a secondary battery 67 that is connected in parallel with the drive motor 64.

Further, with the fuel cell system 2, the electric power stored in the secondary battery 67 is discharged in accordance with control of a battery controller 68, which is controlled by the control unit 36 to be supplied to the drive motor 64 via the battery J/B 66.

That is, the electric power control section 63 controlled by the control unit 36 regulates the electric power output taken out from the stack J/B 62 to be supplied to the battery J/B 66 and the drive motor 64, and the battery controller 68 controlled by the control unit 36 controls charging and discharging phases of the secondary battery 67 while the motor controller 65 controlled by the control unit 36 controls a drive torque of the drive motor 64.

In the control unit 36 of the fuel cell system 2 of such a structure, if the occurrence of the water-clogging phenomenon is estimated, the current electric power output of the fuel cell stack 11 is temporarily maintained even in the presence of a demand for lowering the electric power output of the fuel cell stack 11. In such case, although the electric power output of the fuel cell stack 11 becomes excessively higher than the demanded level, the control unit 36 controls the electric power control section 63 so as to allow resulting excessive electric power to be charged to the secondary battery 67. Under a circumstance where the current electric power output of the fuel cell stack 11 is maintained, upon elapse of a certain time interval (TIM_init), if a situation still takes place where the occurrence of the water-clogging phenomenon is estimated, control is executed to render the hydrogen gas exhaust valve 26 to remain in the closed condition.

Output control operation for controlling the power output of such a fuel cell system 2 is described with reference to a flowchart of FIG. 14. Also, such operation is executed for equal time intervals (such as each 10 msec) using the timer (not shown) in the control unit 36 in the same manner as those of the above-described embodiments.

Figure 14:
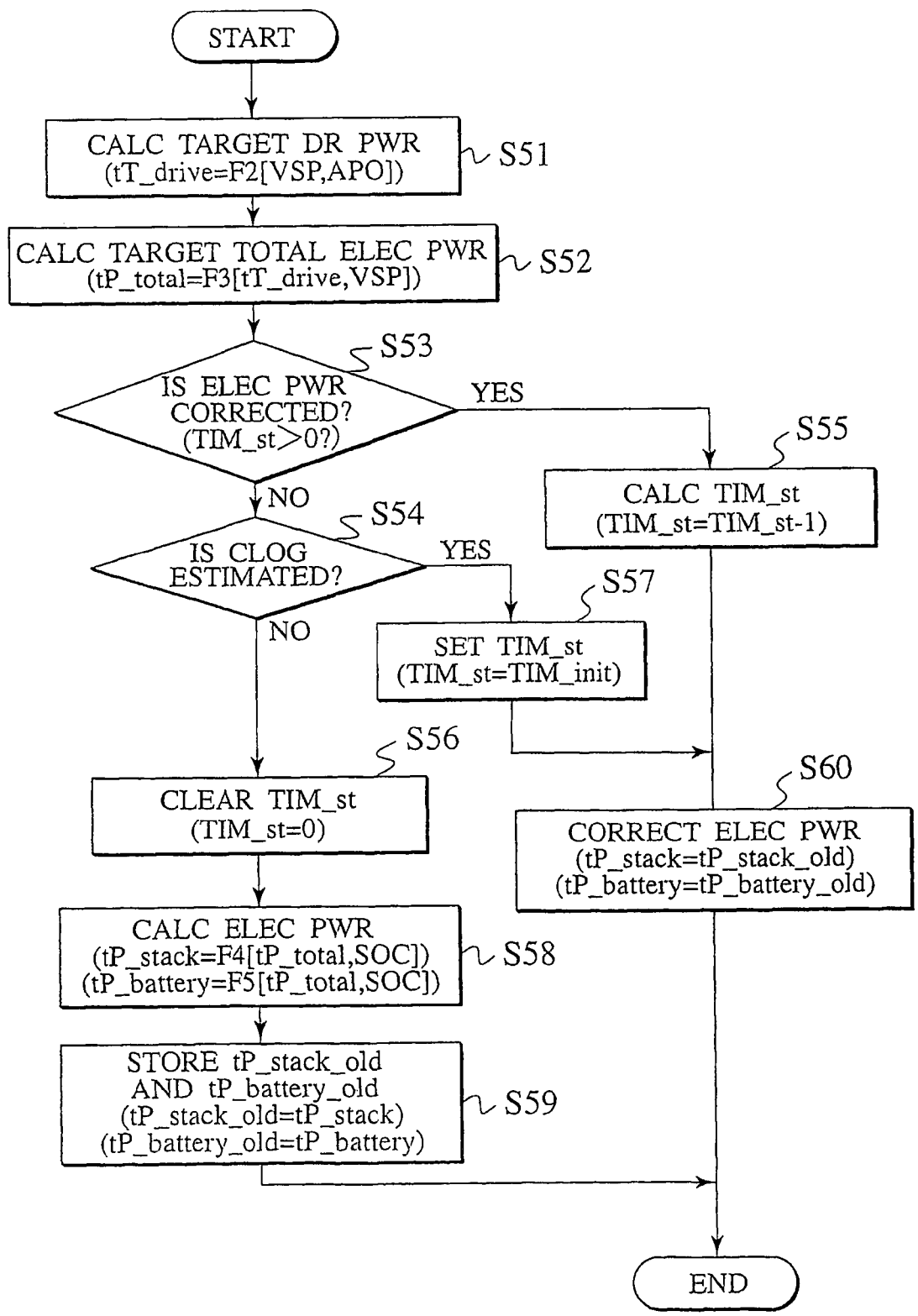
FIG. 14 is a flowchart illustrating an operational sequence of the fuel gas exhaust valve control operation in the present embodiment.

FIG. 14 is the flowchart illustrating an operational sequence of output control operation of the fuel cell system of the presently filed embodiment. Also, such output control operation can be executed in parallel with either one of fuel gas exhaust valve control operations of the first to fifth embodiments set forth above.

Figure 15:
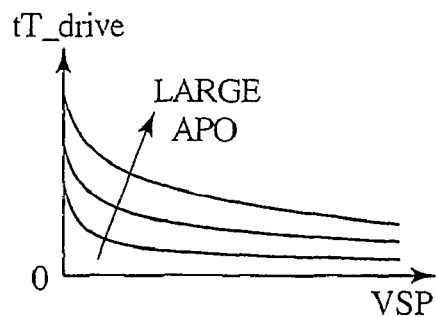
FIG. 15 is a view for illustrating map data describing variations in target drive power depending on the vehicle speed and an accelerator's incremental displacement value, with the abscissa representing the vehicle speed VSP while the ordinate represents the target drive power tT_drive in the present embodiment.

In FIG. 14, in first step S51, the control unit 36 responds to a drive power demand delivered from the exterior, which is typically the driver, to request such as acceleration of the vehicle 1 and executes target drive power calculating operation for the drive motor 64 whereupon the flow proceeds to step S52. When this takes place, the control unit 36 detects the accelerator's incremental displacement value APO and the vehicle speed VSP and refers to map data shown in FIG. 15 which describes variations in the target drive power tT_drive associated with the accelerator's incremental displacement value APO and the vehicle speed VSP. In FIG. 15, the abscissa represents the vehicle speed VSP and the ordinate represents the target drive power tT_drive. This map data is plotted with characteristics of the target drive power tT_drive associated with the vehicle speed for each accelerator's incremental displacement value, thereby enabling the target drive power tT_drive to be obtained depending on the accelerator's incremental displacement value APO and the vehicle speed VSP (i.e. tT_drive =F2 [VSP, APO]). Also, such map data is stored in the memory (not shown) of the control unit 36.

Figure 16:
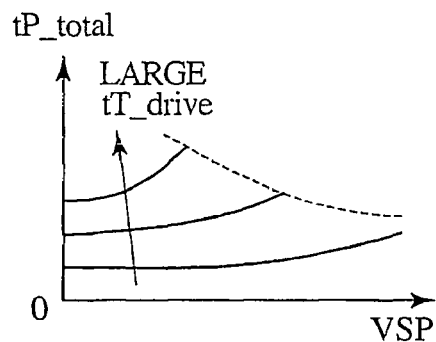
FIG. 16 is a view for illustrating map data describing variations in target total electric power depending on the vehicle speed and the target drive power, with the abscissa representing the vehicle speed VSP while the ordinate represents the target total electric power tP_total in the present embodiment.
Figure 17:
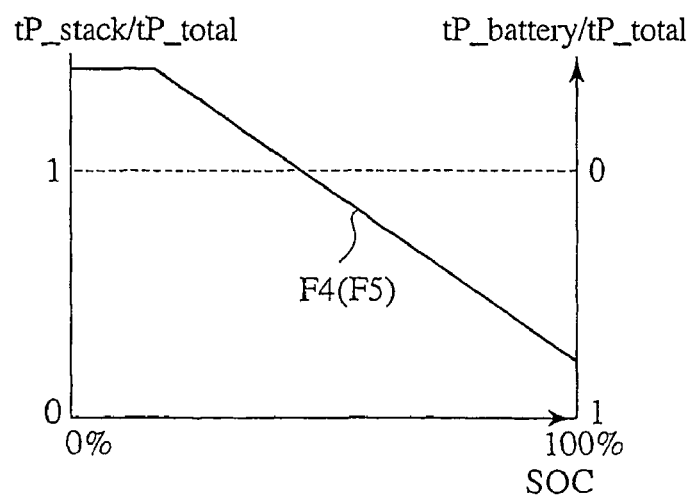
FIG. 17 is a view for illustrating map data describing variation in a target total electric power/target total electric power in terms of SOC and variation in a stack electric power generation amount/target total electric power in terms of SOC, with the abscissa representing the SOC while the left ordinate represents the stack power generation amount tP_stack/target total electric power tP_total and the right ordinate represents a battery power supply amount tP_battery/target total electric power tP_total in the present embodiment.

In subsequent step S52, by using the target drive power tT_drive calculated in step S51, the control unit 36 calculates a target total electric power tP_total required to be generated by the fuel cell stack 11 with a view to driving the motor 64, and the flow proceeds to step S53. In a case where the electric power output is also supplied to the motor 64 from the secondary battery 67, it is probable for the target total electric power tP_total to be equal to the sum of the electric power output required to be generated by the fuel cell stack 11 and the electric power required to be supplied by the secondary battery 67. When this takes place, the control unit 36 refers to map data shown in FIG. 16 that describes the target total electric power tP_total associated with the target drive power tT-drive calculated in step S51 and the vehicle speed VSP. In FIG. 16, the abscissa represents the vehicle speed VSP and the ordinate represents the target total electric power tP_total. This map data is plotted with characteristics of the target total electric power tP_total associated with the vehicle speed VSP for each target drive power tT-drive, thereby enabling the target total electric power tP_total to be obtained depending on the target drive power tT-drive and the detected vehicle speed VSP (i.e. tP_total=F3[tT_drive, VSP]). Also, such map data is stored in the memory (not shown) of the control unit 36.

In succeeding step S53, the control unit 36 executes the discrimination to find if an internally retained value TIM_st of a stack power generation amount correction timer value falls in "0" (i.e. TIM_st=0), thereby implementing the discrimination to find if the correction of the electric power output supplied to the motor 64 from the fuel cell stack 11 is executed. When discriminated that no correction is made in the electric power output of the fuel cell stack 11 (i.e. TIM-st=0), the flow is routed to step S54 and conversely, when discriminated that the electric power output of the fuel cell stack 11 remains in the correction phase (i.e. TIM_st>0), the flow is routed to step S55.

In consecutive step S54, the control unit 36 executes the same steps as either one of the sequences of the steps for estimating the water-clogging phenomenon of the fuel cell stack of the embodiments set forth above and makes the discrimination to see whether the occurrence of the water-clogging phenomenon is estimated therewith. In this instance, if no estimation is made for the occurrence of the water-clogging phenomenon, the flow is routed to step S56 and conversely, if the occurrence of the water-clogging phenomenon is estimated, the flow is routed to step S57.

In succeeding step S56, the control unit 36 clears up the value TIM_st of the stack power generation amount output correction timer to "0" (i.e. TIM_st=0), and the flow is routed to step S58.

Next, in step S58, by using the target total electric power tP_total calculated in step S52 and an SOC (State of Charge) of the secondary battery 67 detected by the battery controller 68, the control unit 36 calculates and obtains a stack power generation amount tP_stack to be generated by the fuel cell stack 11 and a battery power supply amount tP_battery to be supplied by the secondary battery 67 (i.e. tP_stack=F4 [tP_total, SOC], tP_battery=F5[tP_total, SOC]), and the flow is routed to step S59. When this takes place, referring to map data F4, F5 shown in FIG. 17 which describes variation in the battery power supply amount/target total electric power (i.e. tP_battery/tP_total) associated with SOC and variation in the stack power generation amount/target total electric power (i.e. tP_stack/tP_total) associated with SOC, the control unit 36 obtains the stack power generation amount tP_stack and the battery power supply amount tP_battery. Also, such map data is stored in the memory (not shown) of the control unit 36.

In subsequent step S59, the control unit 36 stores the stack power generation amount tP_stack and the battery power supply amount tP_battery, calculated in step S58, in the stack power generation amount tP_stack_old and the battery power supply amount tP_battery_old (i.e. tP_stack_old=tP_stack, tP_battery old=tP_battery) respectively, to be used in subsequent output control operations, respectively, and terminates the series of operations.

In the meantime, in step S57 to which the flow is routed when the water-clogging phenomenon is estimated in step S54, the control unit 36 sets the value TIM_st of the stack power generation amount correction timer value to an initial value TIM_init (i.e. TIM_st=TIM_init), and the flow is routed to step S60. This initial value TIM_init is determined to a predetermined numeric value, for the purpose of reliably discriminating the occurrence of the water-clogging phenomenon of the fuel cell stack 11, to provide a period during which the output of the fuel cell stack 11 is controlled and corrected.

In succeeding step S60, by using the value tP_stack_old and tP_battery_old stored in step S59 related to the preceding output control operation, the output of the fuel cell stack 11 is controlled for correction by the stack J/B 62, the electric power control section 63, the battery J/B 66 and the battery controller 68 to allow the current stack power generation amount tP_stack and the battery power supply amount tP_battery to be the tP_stack_old and tP_battery_old (i.e. tP_stack=tP_stack_old, tp_battery=tP_battery_old), respectively, and terminates the series of operations.

Here, in a case where the occurrence of the water-clogging phenomenon is estimated and the stack power generation amount correction timer value TIM_st is set, that is, even when a demand arises for lowering the electric power output of the fuel cell stack 11 in step S51 and step S52, during a time interval in which the value TIM_st of the stack power generation amount correction timer value is initialized from the initial value TIM_init to "0", the output value of the fuel cell stack 11 to be supplied to the motor 64 is corrected so as to allow the stack power generation amount tP_stack and the battery power supply amount tP_battery to fall in the tP_stack_old and tP_battery_old, respectively, which form preceding values just prior to estimating te occurrence of the water-clogging phenomenon. When this takes place, the control unit 36 controls the electric power control section 63 so as to allow an excessive amount of the electric power output, generated by the fuel cell stack 11, to be stored in the secondary battery 67.

Also, in step S55 to which the flow is routed in the presence of the discrimination in step S53 that the correction of the electric power output of the fuel cell stack 11 is executed, the control unit 36 executes subtracting operation in the value TIM_st of the stack power generation amount correction timer, i.e., calculate such as TIM_st−1 (i.e. TIM_st=TIM_st−1), and the flow is routed to step S60 whereupon the output of the fuel cell stack 11 is continuously controlled for correction and the series of operations are terminated.

Further, the control unit 36 executes fuel gas exhaust valve control operation of each embodiment set forth above in parallel to the above-described output control operation. In this instance, when in estimation that the water-clogging phenomenon occurs, the control unit 36 keeps the hydrogen gas exhaust valve 26 in the closed condition during the time interval until the value TIM_st of the stack power generation amount correction timer reaches to "0" and controllably opens the hydrogen gas exhaust valve 26 at the timing when the value TIM_st of the stack power generation amount correction timer reaches "0".

As set forth above, according to the fuel cell system and the related method of the presently filed embodiment, in a case where the occurrence of the water-clogging phenomenon, which would cause the voltage drop due to formation of the condensed water, of the fuel cell stack is estimated, the electric power output, to be delivered to the load from the fuel cell stack, is appropriately corrected through control of decreasing the amount of the electric power generated by the fuel cell stack per se. Thus, drop in the coolant temperature can be eliminated to a minimal limited value, resulting in a capability of restricting the occurrence of the condensed water to a limited minimum value.

Further, with such a structure, until the value of the stack power generation amount correction timer reaches to "0", that is, when the correction of the electric power output to be supplied from the fuel cell stack to the load is executed, since the hydrogen gas exhaust valve is kept in the closed condition, even if the condensed water is discharged together with the hydrogen gas, resulting amount of discharge is suffice to be small, enabling a fuel consumption rate to be prevented from being deteriorated.

The entire content of a Patent Application No. TOKUGAN 2002-197573 with a filing date of Jul. 5, 2002 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

INDUSTRIAL APPLICABILITY

As set forth above, according to the present invention, a control device of a fuel cell system can be obtained which, when the occurrence of the water-clogging phenomenon in the fuel gas the flow passage through which fuel is supplied to a fuel electrode of a fuel cell stack is estimated, controls a fuel gas exhaust valve, disposed downstream of the fuel cell stack, to be brought into an open condition for exhausting fuel gas from the fuel cell stack. As a consequence, the fuel cell system with such a control device is applicable to a variety of fuel cell systems, which the water-clogging phenomenon is to be studied, and has applications in electric power generators for industrial use or domestic use involving a fuel cell powered vehicle with expectation in a wide application range.

The invention claimed is:

1. A control device for a fuel cell system having a fuel cell stack with an oxidizing electrode supplied with oxidizing gas and a fuel electrode supplied with fuel gas to generate an electric power, the control device comprising:
   an estimating section estimating occurrence of a water-clogging phenomenon wherein condensed water stays in a fuel gas flow passage through which fuel gas is supplied to a fuel electrode of the fuel cell stack;
   a control section controlling a fuel gas exhaust valve, which is disposed downstream of the fuel cell stack to allow the fuel gas to be exhausted from the fuel cell stack, to be brought into an open condition in a case that the estimating section estimates the occurrence of the water-clogging phenomenon; and
   a coolant temperature detecting section detecting a temperature of coolant that cools the fuel cell stack,
   wherein the estimating section is configured to estimate the occurrence of the water-clogging phenomenon responsive to a degree by which the temperature of the coolant is lowered during electric power generation of the fuel cell stack.

2. The control device according to claim 1, wherein the fuel cell stack includes a plurality of stacked structures, each of the stacked structures having an electrolyte layer sandwiched between the oxidizing electrode and the fuel electrode.

3. The control device according to claim 1, wherein the fuel cell system further includes an electric power output detecting section detecting an electric power output generated by the fuel cell stack,
   and wherein the estimating section estimates the occurrence of the water-clogging phenomenon responsive to a degree by which the electric power output generated by the fuel cell stack is lowered.

4. The control device according to claim 3, wherein the fuel cell system is installed on a vehicle, with a motor serving as a drive source, wherein coolant for cooling the fuel cell stack is cooled by a traveling wind stream, and the estimating section estimates the occurrence of the water-clogging phenomenon further in response to a speed of the vehicle.

5. The control device according to claim 4, wherein the estimating section estimates the occurrence of the water-clogging phenomenon responsive to a relationship between a temperature of the coolant, preliminarily determined in compliance with the speed of the vehicle in consideration of an atmospheric air temperature surrounding the vehicle, and the temperature of the coolant that is actually measured.

6. The control device according to claim 1, wherein the fuel cell system is installed on a vehicle, with a motor serving as a drive source, which travels depending on a depressed displacement value of an accelerator pedal, and further includes a depressed displacement value detecting section detecting the depressed displacement value of the accelerator pedal,
   and wherein the estimating section estimates the occurrence of the water-clogging phenomenon responsive to a degree by which the depressed displacement value is lowered.

7. The control device according to claim 6, wherein the vehicle allows coolant for cooling the fuel cell stack to be cooled through a traveling wind stream, and the estimating section estimates the occurrence of the water-clogging phenomenon further in response to a speed of the vehicle.

8. The control device according to claim 7, wherein the estimating section estimates the occurrence of the water-clogging phenomenon responsive to a relationship between i) the temperature of the coolant, preliminarily determined in compliance with the speed of the vehicle in consideration of an atmospheric air temperature surrounding the vehicle, and ii) the temperature of the coolant that is actually measured.

9. The control device according to claim 1, wherein the control section regularly opens the fuel gas exhaust valve in a first predetermined opening period whereupon, in a case that the estimating section estimates the occurrence of the water-clogging phenomenon, the fuel gas exhaust valve is opened in a second predetermined opening period longer than the first predetermined opening period.

10. The control device according to claim 1, wherein in a case that the temperature of the coolant, appearing after rendering the fuel gas exhaust valve in the opened condition, results to be equal to the temperature of the coolant when the estimating section estimates the occurrence of the water-clogging phenomenon, the control section renders the fuel gas exhaust valve to be brought into a closed condition.

11. The control device according to claim 1, wherein the fuel cell system includes i) a load adapted to be driven by the electric power outputted from the fuel cell stack and ii) a secondary battery connected in parallel with the load,
   and wherein the control section temporarily maintains the electric power generated by the fuel cell stack in a case that the estimating section estimates the occurrence of the water-clogging phenomenon.

12. The control device according to claim 11, wherein, in the case that the estimating section estimates the occurrence of the water-clogging phenomenon, the control section supplies a demanded power from the electric power generated by the fuel cell stack to the load while allowing a residual electric power of the electric power, generated by the fuel cell stack, to be stored in the secondary battery.

13. A control device for a fuel cell system having a fuel cell stack with an oxidizing electrode supplied with oxidizing gas and a fuel electrode supplied with fuel gas to generate an electric power, the control device comprising:

estimating means for estimating occurrence of a water-clogging phenomenon wherein condensed water stays in a fuel gas flow passage through which fuel gas is supplied to a fuel electrode of the fuel cell stack;

control means for controlling a fuel gas exhaust valve, which is disposed downstream of the fuel cell stack to allow the fuel gas to be exhausted from the fuel cell stack, to be brought into an open condition in a case that the estimating means estimates the occurrence of the water-clogging phenomenon; and coolant temperature detecting means for detecting a temperature of coolant that cools the fuel cell stack, wherein the estimating means is configured to estimate the occurrence of the water-clogging phenomenon responsive to a degree by which the temperature of the coolant is lowered during electric power generation of the fuel cell stack.

14. A control method for a fuel cell system having a fuel cell stack with an oxidizing electrode supplied with oxidizing gas and a fuel electrode supplied with fuel gas to generate an electric power, the control method comprising:

estimating occurrence of a water-clogging phenomenon wherein condensed water stays in a fuel gas flow passage through which fuel gas is supplied to the fuel electrode of the fuel cell stack;

controlling a fuel gas exhaust valve, which is disposed downstream of the fuel cell stack to allow the fuel gas to be exhausted from the fuel cell stack, to be brought into an open condition in a case that the occurrence of the water-clogging phenomenon is estimated; and detecting a temperature of coolant that cools the fuel cell stack, wherein the estimating of the occurrence of the water-clogging phenomenon is implemented responsive to a degree by which the temperature of the coolant is lowered during electric power generation of the fuel cell stack.

* * * * *